United States Patent
Garg et al.

(10) Patent No.: US 11,017,426 B1
(45) Date of Patent: May 25, 2021

(54) CONTENT PERFORMANCE ANALYTICS

(71) Applicant: BloomReach Inc., Mountain View, CA (US)

(72) Inventors: Ashutosh Garg, Sunnyvale, CA (US); Vache Moroyan, San Mateo, CA (US); Gagandeep Singh, Bangalore (IN); Renuka Khandelwal, Bangalore (IN); Praveen K. Patnala, Santa Clara, CA (US); William Uppington, Hillsborough, CA (US); Siddharth Balwani, San Jose, CA (US); Maksim Zanko, Mountain View, CA (US)

(73) Assignee: BloomReach Inc., Mountain View, CA (US)

( * ) Notice: Subject to any disclaimer, the term of this patent is extended or adjusted under 35 U.S.C. 154(b) by 722 days.

(21) Appl. No.: 14/578,217

(22) Filed: Dec. 19, 2014

Related U.S. Application Data

(60) Provisional application No. 61/919,094, filed on Dec. 20, 2013.

(51) Int. Cl.
G06Q 30/02 (2012.01)
G06F 16/24 (2019.01)

(52) U.S. Cl.
CPC ......... *G06Q 30/0244* (2013.01); *G06F 16/24* (2019.01); *G06Q 30/0256* (2013.01)

(58) Field of Classification Search
CPC . G06Q 30/0244; G06Q 30/0256; G06F 16/24
See application file for complete search history.

(56) References Cited

U.S. PATENT DOCUMENTS

| | | |
|---|---|---|
| 6,466,970 B1 | 10/2002 | Lee et al. |
| 6,697,824 B1 | 2/2004 | Bowman-Amuah |
| 6,963,874 B2 | 11/2005 | Kasriel et al. |
| 6,973,490 B1 | 12/2005 | Robertson et al. |
| 7,353,272 B2 | 4/2008 | Robertson et al. |
| 7,647,323 B2 | 1/2010 | Kasriel et al. |

(Continued)

FOREIGN PATENT DOCUMENTS

| | | |
|---|---|---|
| WO | 2008064343 | 5/2008 |
| WO | 2009050546 | 4/2009 |

(Continued)

OTHER PUBLICATIONS

Study on the Elimination of Duplicated Multimedia Webpages 2012 International Conference on Systems and Informatics (ICSAI 2012) Xiaojuan Yang (Year: 2012).*

(Continued)

*Primary Examiner* — Alexandru Cirnu
(74) *Attorney, Agent, or Firm* — Moser Taboada

(57) ABSTRACT

Techniques for performing content performance analytics are disclosed in accordance with some embodiments. In some embodiments, a process for performing content performance analytics includes receiving content on a web site; performing content performance analytics of content available on the web site using a processor; generating a report that includes a recommended action based on the content performance analytics for the content on the web site; and automatically performing a recommended action based on the content performance analytics for the content on the web site.

14 Claims, 10 Drawing Sheets

(56) References Cited

U.S. PATENT DOCUMENTS

| | | | |
|---|---|---|---|
| 7,818,399 | B1 | 10/2010 | Ross, Jr. et al. |
| 7,975,000 | B2 | 7/2011 | Dixon et al. |
| 8,027,864 | B2 | 9/2011 | Gilbert |
| 8,027,865 | B2 | 9/2011 | Gilbert |
| 8,032,405 | B2 | 10/2011 | Gilbert |
| 8,386,561 | B2 | 2/2013 | Artz, Jr. et al. |
| 8,515,825 | B1 | 8/2013 | Ross, Jr. et al. |
| 8,549,014 | B2 * | 10/2013 | Acharya ........... G06F 17/30864 707/748 |
| 8,554,854 | B2 * | 10/2013 | Benyamin ............. G06Q 10/10 707/731 |
| 8,595,691 | B2 | 11/2013 | Ellen et al. |
| 8,719,105 | B2 | 5/2014 | Minnis et al. |
| 8,756,095 | B2 | 6/2014 | Gilbert |
| 2002/0107882 | A1 | 8/2002 | Gorelick et al. |
| 2002/0186237 | A1 | 12/2002 | Bradley et al. |
| 2008/0097842 | A1 | 4/2008 | Tirumala et al. |
| 2008/0263026 | A1 * | 10/2008 | Sasturkar ........... G06F 17/2211 |
| 2011/0320395 | A1 * | 12/2011 | Dada ...................... G06Q 30/02 706/47 |
| 2012/0185329 | A1 | 7/2012 | Audenaert et al. |
| 2013/0086677 | A1 * | 4/2013 | Ma ..................... G06F 17/3089 726/22 |
| 2014/0032264 | A1 | 1/2014 | Kalikivayi et al. |
| 2014/0082182 | A1 * | 3/2014 | Doan ..................... H04L 43/08 709/224 |

FOREIGN PATENT DOCUMENTS

| | | |
|---|---|---|
| WO | 2014018780 | 1/2014 |
| WO | 2014018781 | 1/2014 |

OTHER PUBLICATIONS

Author Unknown, wikiHow to do anything, How to Identifiy Broken Links in Your Website Using Google Webmaster Tools, Jun. 21. 2013, retrieved from: https://web.archive.org/web/20130821212331/http://www.wikihow.com/Identify-Broken-Links-in-Your-Website-Using-Google-Webmaster-Tools.

Thongpapanl et al., Enhancing Online Performance Through Website Content and Personalization, Journal of Computer Information Systems, Fall 2011, pp. 3-13.

Lin et al., A Study of the Website Performance of Travel Agencies Based on the EMICA Model, Scientific Research, J. Service Science & Management, 2009, pp. 181-185.

Patel et al., Performance Analysis of Content Management Systems—Joomla, Drupal and WordPress, International Journal of Computer Applications, vol. 21, No. 4, May 2011, pp. 39-43.

Tarafdar et al., Determinants of Reach and Loyalty—A Study of Website Performance and Implications for Website Design, Journal of Computer Information Systems, Winter 2007-2008.

Hussin et al., The Importance Ranking of Trust Attributes in e-Commerce Website, Association for Information Systems, AIS Electronic Library (AISeI), PACIS 2007 Proceedings, Pacific Asia Conference on Information Systems (PACIS), Jan. 1, 2007.

Author Unknown, Webmaster Tools, Webmaster Guidelines, Jun. 29, 2013, retrieved from: https://web.archive.org/web/20130629190034/https://support.google.com/webmasters/answer/35769?hl=en.

Edward Miller, The WebSite Quality Challenge, 2000.

Cheung et al., The Asymmetric Effect of Website Attribute Performance on Satisfaction: An Empirical Study, Proceedings of the 38th Hawaii International Conference on System Science, 2005.

Hsiu-Fen Lin, The Impact of Website Quality Dimensions on Customer Satisfaction in the B2C E-Commerce Context, Total Quality Management, Total Quality Management & Business Excellence, vol. 18, No. 4, Jun. 2007, pp. 363-378.

Wang et al., Characterizing Customer Groups for an e-Commerce Website, Proceedings of the 5th ACM Conference on Electronic Commerce, 2004.

Alistair Sutcliffe, Heuristic Evaluation of Website Attractiveness and Usability, Interactive Systems: Design, Specification, and Verification Lecture Notes in Computer Science, vol. 2220, 2001.

\* cited by examiner

CONTENT PERFORMANCE ANALYTICS

CROSS REFERENCE TO OTHER APPLICATIONS

This application claims priority to U.S. Provisional Patent Application No. 61/919,094, entitled CONTENT PERFORMANCE ANALYTICS filed Dec. 20, 2013, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web.

Internet-based web services can be delivered through web sites on the World Wide Web (WWW). Web pages are often formatted using HyperText Markup Language (HTML), eXtensible HTML (XHTML), or using another language that can be processed by a web browser that is typically executed on a user's client device, such as a computer, tablet, phablet, smart phone, smart watch, smart television, or other (client) device. A web site can be hosted on a web server that is typically accessible via a network, such as the Internet, through a web address, which is generally known as a Uniform Resource Indicator (URI) or a Uniform Resource Locator (URL).

Search engines can be used to facilitate searching of web services, such as to identify relevant web sites for particular content and/or services on the World Wide Web. Search engines (e.g., web-based search engines provided by various vendors, including, for example, Google, Microsoft Bing, and Yahoo) provide for searches of online information that includes searchable content (e.g., digitally stored electronic data), such as searchable content available via the World Wide Web. As input, a search engine typically receives a search query (e.g., query input including one or more terms, such as keywords, by a user of the search engine). The search engine performs the search for the search query and outputs results that are typically presented in a ranked list, often referred to as search results or hits (e.g., links or Uniform Resource Locators (URLs) for one or more web pages and/or web sites). The search results can include web pages, images, audio, video, database results, directory results, information, and other types of data.

Search engines typically provide paid search results (e.g., the first set of results in the main listing and/or results often presented in a separate listing on the right side of the output screen). For example, advertisers may pay for placement in such paid search results based on keywords (e.g., keywords in search queries). Search engines also typically provide organic search results, also referred to as natural search results. Organic search results are based on various algorithms employed by different search engines that attempt to provide relevant search results based on a received search query.

For improved Internet marketing, search engine optimization (SEO) has developed as a form of industry/technical consulting (often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine. SEO can target different kinds of search, including image search, local search, and industry specific, vertical search engines to improve the web site's web presence. For example, SEO often considers how search engines work and what people search for to recommend web site related changes to optimize a web site (e.g., which primarily involves editing its content and HyperText Markup Language (HTML) coding to both increase its relevance to specific keywords and to remove barriers to the indexing activities of search engines).

BRIEF DESCRIPTION OF THE DRAWINGS

Various embodiments of the invention are disclosed in the following detailed description and the accompanying drawings.

DETAILED DESCRIPTION

Figure 1:
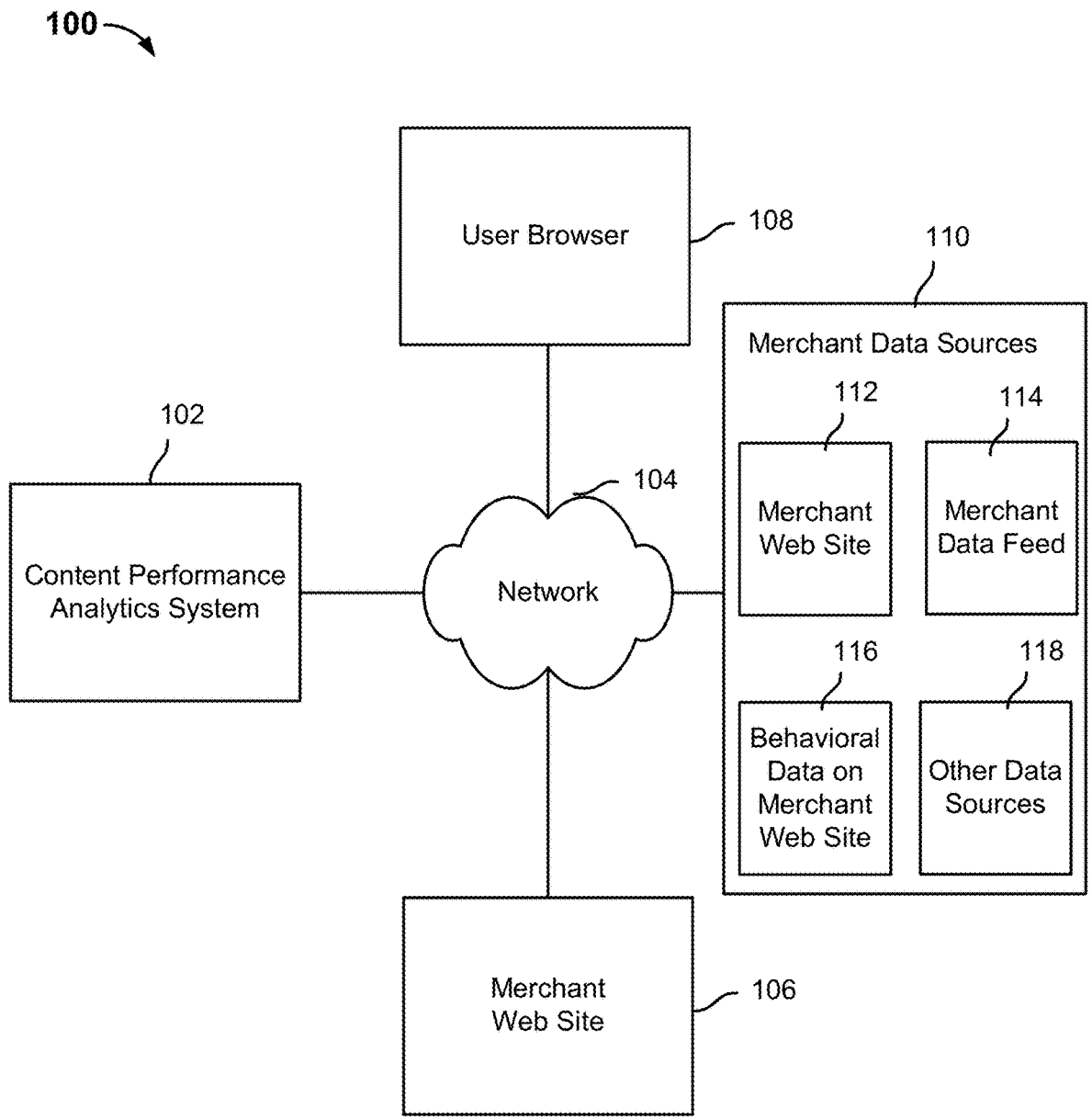
FIG. 1 is a functional block diagram illustrating an architecture of a system for performing content performance analytics in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet-based web services can be delivered through web sites on the World Wide Web (WWW). Web pages are often formatted using HyperText Markup Language (HTML), eXtensible HTML (XHTML), or using another markup and/or programming language that can be processed by a web browser that is typically executed on a user's client device, such as a computer, tablet, phablet, smart phone, smart watch, smart television, or other (client) device. A web site can be hosted on a server (e.g., a web server and/or an application server) that is typically accessible via a network, such as the Internet, through a web address, which is generally known as a Uniform Resource Indicator (URI) or a Uniform Resource Locator (URL).

Web sites can generally be classified as static web sites or interactive web sites. Static web sites and interactive web sites are generally described below.

Static web sites generally include static web content. For example, a web site can include one or more static web pages stored on a web server. Such static web pages are basically delivered to a client web browser in the same format that such web pages are stored on the web server (e.g., the same content is presented to each user that navigates to that particular static web page, which provides a consistent presentation of the static content on that web page to each of the different users/visitors of that web page). Static web pages are typically coded in a markup language, such as HTML, and style sheets, such as Cascading Style Sheets (CSS), are also often used to control the appearance or style of such basic HTML web pages. Static content on a static web site is typically manually updated. For example, a web page editor or other tools can be used by a web site owner to edit the static content on a web page (e.g., editing, adding, or deleting text, photos, and/or other content on the web page).

Interactive web sites (e.g., also referred to as dynamic web sites) generally include dynamic web content (e.g., typically dynamic content can be included along with or in addition to various static content on a web site). Specifically, an interactive or dynamic web site generally includes one or more dynamic web pages (e.g., web pages with dynamic content, such as by providing one or more dynamic elements on a web page). In some cases, a dynamic web page can refer to a web page that can change or customize automatically (e.g., to change over time and/or to present different content to different users to personalize web content for different users, etc.). For example, a dynamic web page can be provided using client-side dynamic web pages that are coded, for example, using JavaScript to implement a dynamic HTML web page that provides instructions to a user's web browser on how to interactively modify content of the web page (e.g., to personalize the content of the web page for a given user or provide other dynamic content for the web page). As another example, dynamic web pages can also be provided using server-side dynamic web pages that are generated automatically (e.g., on the fly) by computer code executed on a server (e.g., a web server or application server) to provide the HTML and CSS for the dynamically generated content for the web page. Dynamic web pages can generally be implemented using various software platforms/tools (e.g., Java Server Pages, Active Server Pages, HTML forms, and/or other software platforms/tools) and/or using various web application frameworks and web template systems that use general programming languages (e.g., Java, Python, and/or other general programming languages) to facilitate the implementation of dynamic web content for interactive or dynamic web sites.

An e-commerce web site generally refers to a web site that allows users to purchase products or services through the web site. E-commerce web sites often include both static and dynamic content on their web sites.

A merchant as used herein generally refers to a third party entity that uses a web site (e.g., on the World Wide Web (WWW)) to engage with customers and/or to buy and sell products and/or services. A merchant web site as used herein generally refers to a web site, such as an e-commerce web site, provided by/for the merchant that facilitates the merchant's online WWW presence to engage with customers and/or to buy and sell products and/or services (e.g., for performing e-commerce on the WWW). Merchant web sites often include both static and dynamic content on their web sites.

Web sites, such as merchant web sites or e-commerce web sites, can include a variety of different static and/or dynamic web page content. The quality of such web content is important to provide an effective web site for users and, therefore, an effective online WWW presence for merchants using e-commerce/merchant web sites to interact with customers and/or potential customers. For example, a merchant web site should generally provide access to content in a manner that is effectively presented to users and facilitates user access and navigation on the merchant web site.

Web site health as used herein generally refers to these and other technical problems that are associated with access to, navigation, presentation effectiveness, and/or search (e.g., optimization of content for organic search) of content (e.g., web content) on web pages of a web site (e.g., including for user access and/or for search engines to crawl and access content on the web site, such as further discussed below). Web site health as used herein also is sometimes referred to as content related (web) site health. For example, a web site that is difficult for a user to navigate and/or to access certain desired content on the web site can be indicative of a web site health problem(s) with the web site. As another example, a web site that has certain content that cannot be crawled or otherwise accessed by search engines for then identifying and presenting to users via organic search results can also be indicative of a web site health problem(s) with the web site.

As such, measuring, monitoring, and maintaining content related site health and the overall web site health of a web site over time, such as with respect to the effectiveness and quality of content on a web site (e.g., also referred to as a site), is a challenging task(s). Specifically, measuring, monitoring, and maintaining the effectiveness and quality of the content on a web site presents various technical challenges and technical problems for web site owners, such as merchants and/or other web site owners.

For example, content on a given web site can often change, as a result of adding new pages and/or modifying existing pages of the web site. As another example, schemas and/or code (e.g., coded algorithms) used to generate dynamic web page content may be generating pages with low quality content (e.g., schemas may be generating duplicative, inaccurate, low relevance, and/or other low quality content). Also, a webmaster for a web site (e.g., a person responsible for creation and/or maintenance of the web site) may not be aware of such dynamically generated content of web pages on the web site. As yet another example, global changes are often made to a site without knowledge of how those changes can impact the content of the site. As yet another example, user generated content can be added and/or removed to pages without a webmaster for the web site having direct control of the content that is being added and/or removed. As yet another example, a webmaster for a web site may not know that there are opportunities to improve the content of existing pages of the web site. As yet another example, a web site can be constructed and/or updated with new content in a way that is difficult for search engines and/or users to navigate content on the web site.

These changes as well as opportunities to improve a web site can often result in a variety of different issues, such as the following example issues. Duplicate pages can be created on a web site, in which one or more pages are duplicated on the web site. Pages with low amounts of content can be created on a web site. Pages with irrelevant and/or low quality content can be created on a web site. Pages with frequently changing content can be created on a web site. A web site can be created with an incorrect canonicalization (e.g., redirects, loops, errors in tagging, etc.), which can make the web site more difficult to navigate and/or search. A web site can include error pages. Pages with under-optimized content can be created on a web site.

In some cases, if certain content related site health issues (e.g., such as one or more of the above-described example content related site health issues) become prevalent on a given web site, then these content related site health issues can negatively impact or hinder performance of the web site on organic search results of search engines (e.g., Google® search engine, Microsoft Bing® search engine, Yahoo® search engine, and/or other search engines). These content related site health issues can also lead to poor user experiences for users interacting with the web site, which can deter users from continuing to use the web site (e.g., a user may opt to use another merchant's web site to search for products/services to purchase).

There are many difficult technical challenges and problems that arise when attempting to evaluate and measure site health and content quality of a web site. For example, these challenges can include one or more of the following: storing all of the page data associated with each page on a web site (e.g., such can be a large amount of data, such as hundreds of gigabytes or more of data, as larger web sites can have hundreds to millions of web pages and web pages can average more than one megabyte per page in size); comparing pages between each other across the site; comparing content changes to a page as well as across the site over time; and/or understanding what metrics matter to determine content quality of the web site.

Current web site analytics tools primarily attempt to provide reports on behavior associated with the web site, such as user visits, revenue, and conversion data collected for the web site. However, current web site analytics tools do not store, measure, and/or report on information based on content associated with the web site. Moreover, such web site analytics tools do not store, measure, and/or report on such behavioral data with an analysis of the content associated with the web site.

Thus, what are needed are new and improved techniques for measuring, monitoring, and maintaining content related site health and the overall web site health of a web site over time. Techniques for automatically remediating identified content related site health problems on a web site are also needed.

Accordingly, techniques for performing content performance analytics (CPA) are disclosed in accordance with some embodiments. In some embodiments, a system for performing content performance analytics includes a data storage device for storing web services data associated with a web site, in which the web services data comprises content on the web site; and a content performance analytics system for receiving content available on the web site based on the web services data and for generating a report that includes a remediation action based on the content performance analytics for the content on the web site.

For example, the web site can correspond to a merchant web site, in which the web services data comprises content for the merchant web site, and in which the web services data further comprises a merchant data feed, web page content associated with the merchant web site, behavioral data associated with user activity on the merchant web site, a site map for the merchant web site, and/or a web server/API log for the merchant web site.

In an example implementation, the content performance analytics can be provided as a subscription server for a plurality of web sites.

In one embodiment, the content performance analytics further includes a duplicate content detector for identifying duplicate web pages associated with the content on the web site based on a threshold comparison. Various duplicate content detector techniques are further described below.

In one embodiment, the content performance analytics further includes a thin content detector for identifying web pages associated with the content on the web site that have less than a threshold level of unique content. Various thin content detector techniques are further described below.

In one embodiment, the content performance analytics further is configured to prioritize a remediation action for a content related site health issue for a web page associated with the content on the web site based on behavior data associated with the web page. Various content performance analytics techniques using behavior data are further described below.

In one embodiment, the content performance analytics further includes a flux scoring engine for determining an overall flux score for content on the web site. Various flux scoring techniques are further described below.

In one embodiment, the content performance analytics further includes a volume scoring engine for determining an overall volume score for content on the web site. Various volume scoring techniques are further described below.

In one embodiment, the content performance analytics further includes a content performance analytics engine for generating a trending report for one or more site health issues for content on the web site. For example, the trending report can include a graphic visualization of a performance of the content on the web site over a period of time.

In some embodiments, a process for performing content performance analytics includes receiving content on a web site; performing content performance analytics of content available on the web site (e.g., using a processor); generating a report that includes a recommended action based on the content performance analytics for the content on the web site; and automatically performing a recommended action based on the content performance analytics for the content on the web site.

In some embodiments, a computer program product (e.g., embodied in a tangible, non-transitory computer readable storage medium) for performing content performance analytics, the computer program product being embodied in a tangible, non-transitory computer readable storage medium, includes receiving content on a web site; performing content performance analytics of content available on the web site; generating a report that includes a recommended action based on the content performance analytics for the content on the web site; and automatically performing a recommended action based on the content performance analytics for the content on the web site.

For example, a content performance analytics (CPA) product (e.g., implemented as a system or process executed on a computer processor) can be provided that automatically measures an overall site health of a web site (e.g., an e-commerce/merchant website and/or other types of web sites) and the quality of the content on a set of web pages. In an example implementation, the CPA product generates a set of scores and reports based on the measured overall site health of the web site. In some cases, the CPA product can automatically remediate one or more issues identified with the content related site health of the web site. These and other aspects of the CPA product implementing the disclosed CPA techniques are further described below.

These and various other techniques for performing content performance analytics for web sites are further described below.

FIG. 1 is a functional block diagram illustrating an architecture of a system for performing content performance analytics in accordance with some embodiments. FIG. 1 provides an exemplary architecture of a system 100 for performing content performance analytics that can be implemented using various computing hardware and performing various processes executed on computing hardware as will be further described below.

Referring to FIG. 1, a content performance analytics system 102 is shown in communication with a network 104 (e.g., the Internet), such as the Internet. Content performance analytics system 102 is in communication with one or more web sites (e.g., e-commerce sites or other sites), such as a merchant web site 106 as shown. Merchant web site 106 can be in communication via network 104 with one or more user browsers, such as a user browser 108 as shown (e.g., a web browser, such as Apple Safari®, Google Chrome®, Microsoft Internet Explorer®, or another web browser, which can be executed on a user client device, such as a laptop/desktop computer, tablet, smart phone, smart watch, or another client device capable of Internet/WWW access). Content performance analytics system 102 is also in communication with various data sources (e.g., merchant web services related data sources) via network 104, such as further described below.

As also shown in FIG. 1, data sources include various web site related data sources, shown as merchant data sources 110. As shown, merchant data sources 110 can include a merchant web site 112 (e.g., a corpus of web pages, such as one or more web pages that are published on the merchant's web site 106, which can be captured using web crawling techniques to periodically crawl web pages of merchant web site 106, such as further described below), a merchant content data feed 114 (e.g., a merchant product data feed and/or other merchant content data feed, such as further described below with respect to various embodiments), behavioral data on the merchant web site 116 (e.g., user behavior on merchant web site 106 can be captured using pixel log data techniques, such as further described below), and various other data sources 118 (e.g., various other web data sources including a site map of the web site, web server/API logs, as well as various other potential web related data sources, such as search logs, social media data sources, electronic mail data sources, browsing history data sources, and/or other data sources can be provided).

As will now be apparent to one of ordinary skill in the art, similar web services related data for a plurality of different web sites (e.g., different e-commerce web sites and/or other types of web sites) can be provided to facilitate using content performance analytics system 102 as, for example, a cloud service for enhancing content related site health on merchant and/or other web sites by applying content performance analytics disclosed techniques for web services (e.g., a subscription service for content performance analytics for merchant/e-commerce web sites, which can be implemented as a cloud service), such as further described herein.

In an example implementation, content performance analytics system 102 is in communication with each of the merchant data sources, such as shown in FIG. 1, to receive or collect merchant web site data, merchant data feeds, behavior data on the merchant web sites, and/or other data sources for each of the one or more merchants. For example, merchants can subscribe to a cloud service for content performance analytics to improve content related site health on their respective web sites (e.g., in which the cloud service can be implemented using a cloud service provider, such as using Amazon Web Services™ (AWS) or other cloud service data center providers, such as further described below).

In some embodiments, the above-described data sources (e.g., data sources 110 such as for a given merchant and/or other data sources for other merchants) can be processed using various techniques as described below. For example, a web site content crawling process can be performed (e.g., implemented using a web site content crawling engine) to periodically crawl and fetch web pages on a target web site (e.g., to periodically crawl and fetch web pages on a subscribing merchant web site 106, and also shown as a data source, merchant web site 112 of merchant data sources 110). The content (e.g., HTML content, dynamic content such as Java Script content, and/or other content) can be fetched from the merchant web site, and the web site content (e.g., of each crawled and fetched web page of the web site) can then be parsed and analyzed using disclosed content performance analytics techniques, such as further described below. As another example, in some cases, a merchant data feed retrieving process can be performed (e.g., implemented using a merchant data feed retrieving engine) to retrieve merchant content/product data feeds (e.g., merchant data feed 114) and parse product attributes, such as title, heading, description, and/or price. In some cases, a merchant data feed can be used to analyze whether content in a merchant content/product data feed is accessible via the merchant web site as an example measure of content related site health using disclosed content performance analytics techniques, such as further described below. As yet another example, a behavior data collection process can be performed (e.g., implemented using a behavioral data collection engine) using pixel data on a merchant's web site. Using this approach, when a user visits a web page of a given merchant's web site, then dynamic content (e.g., Java Script code or other dynamic code/content) on the web page generates a pixel request to the merchant data sources (e.g., a server that is provided for capturing behavioral data on the merchant web site, such as shown as merchant data sources 110) that includes, for example, a machine IP (e.g., the IP address associated with the user's device), a user ID (optional), a referrer URL (e.g., the URL of the web page that preceded the web page in question), a web page URL, and/or other information (optional). In this example, raw pixel data can then be provided from each of the merchants (e.g., shown as behavioral data 116 for merchant web site 106). Each of the data sources is described in more detail below in accordance with various embodiments.

As similarly described above, a continuous process can be performed to crawl and fetch pages from a subscribing web site (e.g., implemented using a web site crawling engine, which can be implemented to perform crawling and fetching operations as described herein). For example, the crawling and fetching operation can receive as input a list of URLs on a merchant web site and fetch the content of each such web page (e.g., HTML and/or other content on each of the fetched web pages). As further described below, the content of a fetched web page can then be parsed by applying various parsing rules (e.g., implemented using a parsing engine) configured for web pages (e.g., manually configured for a particular merchant's web pages or using a default configuration for parsing typical merchant web pages). For example, the parser operation can parse each page to extract various elements and/or content related attributes, such as further described below. As such, content published on a merchant's web site can be fetched and parsed, and the merchant's web site content can then be used for performing disclosed content performance analytics techniques as further described below.

In some cases, a process can also be performed to retrieve merchant content/product data feeds for each of the merchants (e.g., implemented using a merchant data feed retrieving engine as disclosed herein). In an example implementation, the merchant can either provide a location to fetch the merchant data feed or upload the merchant data feed to a location specified for retrieving (e.g., pulling) the merchant data feed (e.g., periodically or upon demand). For example, the merchant data feed can be provided as a file (e.g., in a format that can be parsed, such as in an XML or other file format that provides a (subset) view of, for example, a merchant's product/service catalog, such as by providing incremental updates to product catalog information using such merchant data feeds). In this example, the merchant data feed includes a content classification (e.g., a merchant product data feed can include a product classification) that can then be used for performing various content performance analytics techniques disclosed herein. In some cases, the merchant data feed can be provided on a daily or hourly basis (e.g., or at some other periodic/time interval and/or based on demand). For example, the merchant data feed can be parsed using parsing rules configured for a given merchant or a set of merchants (e.g., based on types/groups of merchants) to extract attributes, such as title, heading, and description. In some cases, the merchant data feed can also include a content classification (e.g., a merchant product data feed can include a product classification) that can then be used for performing various content performance analytics techniques disclosed herein.

Another data source of information is behavioral user data on a web site, such as merchant web site 106. In some cases, a user may visit a merchant web page, such as a user using user browser 108 via network 104. For example, Java Script code (e.g., or other executable code/content) on the web page can make a pixel request to a server/service (e.g., to a server/service of the merchant data sources and/or a server/service of the service provider for the content performance analytics system) that includes, for example, a machine IP (e.g., the IP address associated with the user's device), a user ID (optional), a referrer URL, a web page URL, and/or other information (optional). The list of web page URLs can be combined periodically (e.g., each day or at some other periodic interval) and provided as input to the above-described fetching and parsing process to extract information from web pages of a merchant's web site. In an example implementation, for each user, information can be stored to identify products visited and purchased by the user. Similarly, information can be stored to aggregate all user visits and products purchased on the merchant web site. As such, various web site activity related metrics, such as number of impressions, number of views, number of purchases, and/or other metrics, can be collected to provide behavioral data on a merchant's web site, and the behavioral data on the merchant's web site can then be used for performing various content performance analytics techniques disclosed herein. For example, behavior data on a merchant's web site can be used to make recommendations (e.g., based on traffic and/or revenue in behavior data) to prioritize pages that are identified as having content related health issues and which can also be identified with a higher priority for remediation action(s) (e.g., to fix the content related health issues, and to recommend, for example, which page to keep of duplicate page content based on traffic and/or revenue), such as further described below.

In one embodiment, the above-described processes for merchant data source collection and processing are performed per each merchant. For example, each merchant's data is processed independently using the above-described processes for processing each merchant's respective data sources to implement content performance analytics techniques disclosed herein for each of the merchant's respective web sites.

In an example use case scenario, content performance analytics techniques disclosed herein, such as implemented by content performance analytics system 102, can be implemented for merchant web site 106. For example, an e-commerce web site for ACME Company that sells various clothing/apparel products can use the content performance analytics system to improve and/or maintain content related site health of the web content on its web site (e.g., ACME can subscribe to a service that provides the content performance analytics system as a service, such as a cloud service). In an example implementation, the content performance analytics system generates a report and recommendation based on content on ACME's web site by applying the disclosed techniques. As an example, the report can include recommended actions that can be automatically performed to remediate one or more content related site health issues identified with the web content on ACME's web site using content performance analytics techniques further described below.

An example component diagram showing various components of content performance analytics system 102 of FIG. 1 will now be described with respect to FIG. 2. Content performance analytics techniques are also described below with respect to FIG. 2.

Figure 2:
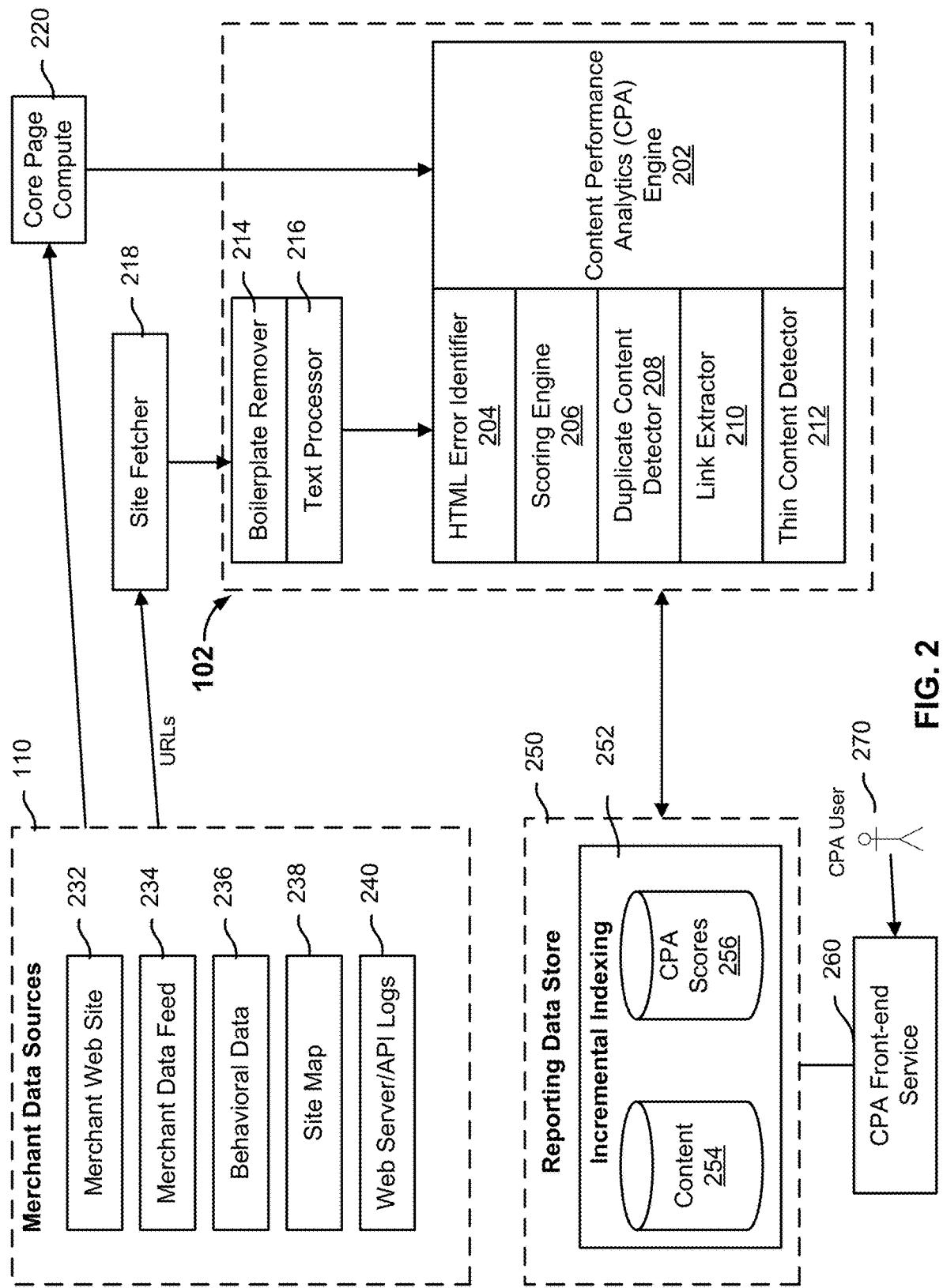
FIG. 2 is a functional block diagram illustrating components of the content performance analytics system in accordance with some embodiments.

FIG. 2 is a functional block diagram illustrating components of the content performance analytics system in accordance with some embodiments. In particular, various components of content performance analytics system 102 are shown in FIG. 2 in accordance with some embodiments.

As shown in FIG. 2, an architecture of content performance analytics system 102 can be implemented using several components to determine content performance analytics results (e.g., reports, recommendations, and/or remediation actions) for a given web site in accordance with some embodiments. As will be apparent to one of ordinary skill in the art, the various components (e.g., data stores, subsystems/engines, and other (sub)components) shown in FIG. 2 are an example implementation of content performance analytics system 102, and such components can be integrated and/or further separated into distinct sub-components to similarly implement the disclosed content performance analytics techniques.

In one embodiment, content performance analytics system 102 is configured to perform content performance analytics (e.g., based on content of web pages associated with a web site) using a variety of disclosed content performance analytics techniques, such as described below. For example, content performance analytics system 102 can generate a report and recommendations to enhance content of a web site to improve content related site health issues associated with content of the web site. As another example, content performance analytics system 102 can implement a remediation action(s) (e.g., based on authorized recommendations) to enhance content of a web site to improve content related site health issues associated with content of the web site. These and other disclosed content performance analytics techniques that can be performed using content performance analytics system 102 are further described below.

In one embodiment, content performance analytics system 102 is configured to provide a set of scores based on identification of one or more content related site health issues, such as described below. In some cases, the content performance analytics system can evaluate various aspects related to content of a web site to measure and score content related site health issues of the web site (e.g., such evaluations can be used to generate a content related site health report, which can include such scores and/or other information, such as recommendations and/or potential remediation actions (actionable recommendations)).

For example, the content performance analytics system can identify bad pages for the purposes of improving site health by optimizing or removing pages through, in some cases, minimizing irrelevant pages; removing or augmenting pages with low content; eliminating duplication; and/or reducing content fluctuation, such as further described below.

As another example, the content performance analytics system can identify good pages for the purposes of increasing organic traffic to the site by optimizing pages through, in some cases, improving content relevance of high trafficked pages; adding content to trafficked pages with low content volume; canonicalizing near duplicate pages to main traffic driving pages; identifying pages with high revenue per visit (RPV) potential but low traffic; and/or identifying pages that are trending up, such as further described below.

As yet another example, the content performance analytics system can improve a discoverability of web pages through a link structure of a web site (e.g., improving link structure, such as by identifying core pages and linking to other (non-core) pages from core pages), such as further described below, for example, with respect to FIG. 3.

As such, the disclosed content performance analytics techniques provide new and improved solutions for measuring the site health and content quality of a web site. For example, such new and improved techniques can be implemented using the disclosed content performance analytics (CPA) system to associate behavioral data to an analysis of the web site content, such as visits and revenue, and provide metrics, reports, and recommendations associated with this correlated analysis over time. In one embodiment, the CPA system automatically parses web pages and identifies the boilerplate and automatically removes the web page boilerplate content to focus content analysis on unique content (e.g., based on identification of common terms/links and applying a threshold-based comparison, such as common across 90% of web pages on a web site, on each page of a web site, as such is just part of the template, such as further described below). These and other content performance analytics techniques are further described below with respect to the content performance analytics system shown in FIG. 2.

In an example implementation, the content performance analytics system provides scores and recommendations that identify various content related site health issues (e.g., good pages, bad pages, link structure, and/or other aspects of content related site health issues of the site). The content performance analytics system can also track these issues over time (e.g., to show scores over a period of time for each of these issues, such as to indicate whether such issues are improving, to track improvements resulting from implemented recommendations or executed remediation actions). The content performance analytics system can be implemented to perform these and other content performance analytics techniques as shown in FIG. 2 and described below.

Referring to FIG. 2, content performance analytics system 102 and merchant data sources 110 are shown. For example, a merchant can have a web site, such as an e-commerce site or other type of site, and the merchant can be a customer (e.g., subscriber) to a content performance analytics services that is implemented using the content performance analytics system as further described below.

Merchant Data Sources

As shown, merchant data sources 110 includes a merchant web site 232, which can include a corpus of content (e.g., a plurality of web pages). The merchant web site can be crawled using a site fetcher 218, such as further described below.

In addition, merchant data sources 110 includes a merchant data feed 234. For example, the merchant data feed can include a product data feed that provides information included in the merchant's product catalog (e.g., in an XML format file or another format that can be parsed to extract attributes associated with products offered by a merchant, and can be provided as an incremental update to the merchant's product catalog). The merchant data feed can be collected by and/or sent to content performance analytics system 102 as similarly described above with respect to FIG. 1.

As also shown, merchant data sources 110 includes behavioral data 236, which can include user activity data based on user interactions with the merchant web site. For example, the behavioral data can be captured and provided to the content performance analytics system using pixel log data techniques, such as described above. In an example implementation, behavior data on a merchant's web site can be used to make recommendations (e.g., based on traffic and/or revenue in behavior data) to prioritize pages that are identified as having content related health issues and which can also be identified with a higher priority for remediation action(s) (e.g., to fix the content related health issues, and to recommend, for example, which page to keep of duplicate page content based on traffic and/or revenue), such as further described below.

Merchant data sources 110 also includes a site map 238. For example, the site map can provide a list of pages of the merchant web site (e.g., a list of URLs, which can be in an XML file format or other format) that are accessible to web crawlers or users, which can be used by site fetcher 218 for crawling the merchant web site, such as further described below.

Merchant data sources 110 also includes web server/API logs 240. For example, web server/API logs can provide server and API related logs for the server that hosts the merchant web site, which can be used by the content performance analytics system to perform various content performance analytics disclosed techniques, such as further described below.

As also shown, web pages on a web site (e.g., a merchant web site or other web site) are crawled and fetched using site fetcher 218 (e.g., a web crawling and fetching engine can crawl one or more URLs associated with the merchant web site and fetch content from each of the crawled web pages for storing and processing for content performance analytics techniques as further described below). For example, the site fetcher can be configured to automatically perform this operation on a weekly basis or at some other periodic interval, schedule, and/or on demand. The crawled and fetched web pages (e.g., content available on the crawled web site) can be stored in a data store shown as content data store 254 (e.g., for storing the content from the crawled and fetched pages of the web site). As further described below, the stored content can be indexed to facilitate searching of the content, as shown by incremental indexing 252, which can perform incremental indexing on various data stores, including content data store 254 and CPA scores data store 256. For example, the stored content can be indexed using an Apache Solr™ open source enterprise platform or another commercially available or open source indexing platform.

Site Fetcher, Boilerplate Remover, and Text Processor

In one embodiment, web pages fetched by site fetcher 218 are provided to the content performance analytics system 102 for performing disclosed content performance analytics techniques, such as further described below. As shown, web pages fetched by site fetcher 218 are provided to boilerplate remover 214 (e.g., a boilerplate remover engine). For example, the boilerplate remover can automatically/programmatically remove the boilerplate (e.g., header and footer and/or other boilerplate from pages) from the fetched content on each web page of the web site. Removal of such boilerplate allows the content performance analytics system to analyze the identified unique content of each of the web pages of the web site using the disclosed content performance analytics techniques. For example, the boilerplate remover can identify the boilerplate using various techniques, such as by detecting if content is duplicated on a threshold number of pages of the web site (e.g., 90% of web pages of the site or some other threshold level), then redact as such is deemed boilerplate content that is not included in the unique content of the web pages of the web site.

In one embodiment, unique content of each of the fetched content on each page of the web site is provided from boilerplate remover 214 to text processor 216 (e.g., a text processing engine for processing content on web pages) for automatically processing and classifying textual content of the unique content of each of the fetched content on each page of the web site. Example content classifications can include a title tag, a header, a footer, a page body, a product title, a product description, a product size, a product color, a breadcrumb, and/or other content classifications. The classified content can then be further analyzed using the disclosed content performance analytics techniques, such as by applying scoring, applying behavioral data (e.g., including visits and revenues, which can be applied to the scores), and/or providing recommendations for changes to make to the web site, such as further described below.

Content Performance Analytics (CPA) System

In one embodiment, content performance analytics system 102 using a content performance analytics (CPA) engine 202 generates reports that can report information (e.g., a CPA report for a web site analyzed by CPA system 102) that shows a site health status for a web site and can also report such site health status of the site over time. In an example implementation, the CPA report can include trending data that shows a trending site health for the site (e.g., improvement in removal of duplicate content, such as duplicate titles, etc.), such as further described below. Reports are sent from content performance analytics system 102 to reporting data store 250, in which reporting information can be stored in CPA scores data store 256. As further described below, the stored content, including CPA scores data stored in CPA scores 256, can be indexed to facilitate searching of the CPA scoring data. For example, the stored CPA scoring data can be indexed using an Apache Solr™ open source enterprise platform or another commercially available or open source indexing platform.

In one embodiment, content performance analytics system 102 is configured to perform automatic remediation for one or more aspects identified based on site health status. For example, the content performance analytics system can automatically add content (e.g., by leveraging the existing content on a merchant's web site) to one or more web pages of a web site to remediate for thin content on the web site, such as using a related products widget and/or related searches widget to supplement a thin content issue identified in a CPA report for one or more web pages of the web site. In an example implementation, such widgets can be dynamically populated via a remote API (Application Program Interface) call or other data delivery mechanism.

In an example implementation, content performance analytics system 102 is implemented using a cloud computing service, such as using Amazon Web Services™ (AWS), and reporting data store 250 is implemented using a cloud data warehouse solution, such as using Amazon Redshift™, which provides a fast, fully managed petabyte-scale data warehouse solution. For example, the data fetched from merchant data sources 110 can be processed by content performance analytics system 102 by performing a MapReduce job (e.g., implemented using the Apache® Hadoop™ framework for performing a distributed processing of large data sets across clusters of computers, for example, using server class hardware, such as provided by the AWS cloud computing environment).

As shown, content performance analytics system 102 includes content performance analytics (CPA) engine 202 that includes a plurality of components that each perform different content performance analytics techniques, including an HTML error identifier 204 (e.g., HTML error idensimilarly be used for performing the disclosed content performance analytics techniques.

Below is an example schema for what is stored in reporting data store 250 after CPA system processing by content performance analytics system 102.

| | |
|---|---|
| url | Url of the page |
| br_page_type | Page type classification |
| title | Title of the page |
| heading | Heading of the page |
| rel_canonical | Canonical URL tag from html |
| duplicate_title_pages | List of duplicate (dup) pages by title |
| duplicate_heading_pages | List of dup pages by heading |
| duplicate_content_pages_with_br | List of dup body pages with widgets |
| duplicate_content_pages_without_br | List of dup body pages without widgets |
| duplicate_pages_with_br | List of overall dup pages with widgets |
| duplicate_pages_without_br | List of overall dup pages without widgets |
| document_length_unique_with_br | Document length unique keywords with widgets |
| document_length_overall_with_br | Document length all keywords with widgets |
| document_length_unique_without_br | Document length unique keywords without widgets |
| document_length_overall_without_br | Document length all keywords without widgets |
| num_related_products | Number of related product items |
| num_related_searches | Number of related search items |
| is_soft_error | Flag for soft error |
| soft_error_tag | Soft error description |
| is_core_page | Is this a core page |
| core_inlinks_with_br | Links from core pages with CPA provider |
| core_inlinks_without_br | Links from core pages without CPA provider |
| inlinks_with_br | Links from all pages with CPA provider |
| inlinks_without_br | Links from all pages without CPA provider |
| inlinks_from_rs | Links from RS widget |
| inlinks_from_rp | Links from RP widget |
| has_br_widgets | If the CPA provider widget shows up |
| relevant_queries | List of anchors to this page through related searches (RS) widget |
| unique_unigrams_added_by_rp | List of unique unigrams through related products (RP) widget |
| unique_bigrams_added_by_rp | List of unique bigrams through RP widget |
| visits | Number of organic search visits to this page |
| discovery_date | Data when the page is discovered |
| recommendation | CPA provider recommendation for a page |
| http_status_code | HTTP status code during crawling |
| redirected_to | URL of the page to which this page is redirected to (if its redirected) |
| final_redirected_url | URL of the final page to which this page is redirected to (if its redirected) |
| num_redirects | Length of the redirect chain (if its redirected) |
| all_h1 | List of H1 tags on page |
| misconfigured_h1 | Set of H1 is incorrectly set |
| title_has_relevant_keywords_after_cutoff | Set if the title has relevant keywords after a set limit (e.g., 65 characters) |
| num_meta_descriptions | Number of meta description items |
| is_page_meta_robo_noindexed | Set if no-index tag is set on the html |
| url_has_non_ascii_chars | Set if the URL has non-ASCII characters | tifier engine), a scoring engine 206, a duplicate content detector 208 (e.g., duplicate content detector engine), a link extractor 210 (e.g., link extractor engine), and a thin content detector 212 (e.g., thin content detector engine). As also shown, a core page compute component 220 (e.g., core page compute engine) is in communication with merchant data sources 110 and provides the core page compute processing output to content performance analytics engine 202. Each of these components and the functionality performed by each of these components will now be further described below.

Reporting Data Store

In one embodiment, data processed by content performance analytics system 102 is stored in a schema (e.g., for what is stored in a data store, such as reporting data store 250, after CPA system processing) to facilitate efficient processing of the data (e.g., web site related services data for one or more web sites). An example schema is illustrated below. As will be apparent to one of ordinary skill in the art, various other schemas or other data structure formats can In the above example schema, the widgets can be CPA provider widgets (e.g., widgets that can be provided by the CPA provider, which implements the CPA solutions as a service for the web site(s)). For example, the CPA provider can also implement various widgets for dynamically providing content for a web page of a web site. Example widgets, such as described in the above example schema, can include a related products widget and a related searches widget. The related products widget can dynamically suggest related products on a web page to enhance product content on the web page. The related searches widget can dynamically suggest related searches on a search page results web page to enhance search query results for a user of the web site performing searches for content on the web site. Example commercially available widget solutions, including related products (RP) and related searches (RS) widgets, that can be used to implement such widgets (e.g., CPA provider widgets) are available from BloomReach, Inc. In an example implementation, the CPA provider widgets can be used by the CPA provider to implement various automated remediation techniques to resolve various CPA identified issues related to site health of a web site based on disclosed content performance analytics techniques, such as further described below.

Core Page Compute

In one embodiment, a core page compute component 220 (e.g., core page compute engine) is in communication with merchant data sources 110 and provides the core page compute processing output to content performance analytics engine 202. For example, the core page compute engine can identify a subset of pages of a web site (e.g., a merchant web site) that are deemed to be core pages of the web site (e.g., most valuable web pages of the merchant web site).

The core page compute engine can be used by the content performance analytics system to improve the efficacy of the disclosed content performance analytics techniques for customers of the service. In an example implementation, the content of a customer web site is analyzed by crawling the web site, such as merchant web site 232 crawled and fetched using site fetcher 218 as similarly described above. As also discussed above, the content performance analytics system also has access to web server logs/API logs 240 for the merchant web site, which can be retrieved by core page compute 220 as shown in FIG. 2. For example, the web server/API logs can indicate various web services related data associated with the merchant web site, such as the following: when a web page of the merchant web site was accessed, the referrer (e.g., user agent and IP address), and/or the URL from which a web page was accessed from (e.g., referrer URL). From this crawled web site content and web server/API logs related information, core page compute 220 identifies a set of core pages for the merchant web site, as further described below.

In one embodiment, core page compute 220 processes the above-described web services related data from merchant data sources 110, including crawled web site content (232) and web server/API logs related information (240), and identifies pages of the web site to compute core pages of the web site. In an example implementation, the core page compute engine identifies pages of the web site that have been crawled by a reputed crawler (e.g., a crawler of a well-known search engine, such as for the Google® search engine, Microsoft Bing® search engine, or Yahoo® search engine) at least a threshold number of times over a period of time, such as at least once in half the number of days over a time period of a number of days (e.g., during a period of, for example, seven to thirty days), or greater than a threshold number of daily organic search visits (e.g., greater than three or some other number of daily organic search visits). For example, the web site can be crawled (e.g., continuously, periodically, and/or upon demand), and the core page compute engine can process the latest crawled data for the web site (e.g., continuously, periodically such as once per day or once per week, and/or upon demand), and the crawled data can be stored for a period of time (e.g., for a certain number of weeks or months, such as for at least three months, so as data does not expire). As will now be apparent to one of ordinary skill in the art, other metrics or attributes associated with web pages of the web site that can be determined from web services related data captured in the merchant data sources (e.g., merchant data feed, behavior data, site map, and/or other information) can be used to identify and select core pages of the web site.

In one embodiment, the identified pages of the web site are output by the core page compute engine as core pages of the web site, which are provided to the content performance analytics system for further processing using disclosed content performance analytics techniques as further described below. For example, space or real estate on core pages of the web site (e.g., merchant web site) can be used for widgets (e.g., CPA provider widgets, such as described above) to prioritize the placement of links to other pages on the web site and/or to CPA provider generated pages on the web site (e.g., new pages added to the web site in which the new pages are automatically generated with content by the CPA provider, such as to remediate thin content or other site health issues using disclosed content performance analytics techniques as further described below).

Scoring Engine

In one embodiment, a scoring engine 206 is a component of content performance analytics engine 202. For example, the scoring engine can score content of pages of a web site (e.g., a merchant web site) to provide different types of scores as further described below.

In an example implementation, the scoring engine can provide one or more of the following four high-level buckets of scores, including (1) a content score; (2) a volume score; (3) a uniqueness score; and (4) a flux score. A content score is a score that is generally used to measure the quality of a match between a landing page (LP) title and content in the title and descriptions of all the products on the page. A volume score is a score that is generally used to measure an amount of content that exists on each page. A uniqueness score is a score that is generally used to measure a similarity of the LP compared to the next closest LP. A flux score is a score that is generally used to capture a rate of change of products and content on a LP (e.g., which can be used to indicate sudden content drops on a given LP). For example, each of these types of scores can be implemented by the scoring engine to support these high-level buckets of scores that can be used by the content performance analytics system to identify issues that may exist on the site from a content perspective/standpoint as well as to flag opportunities to further optimize the site (e.g., to add new content and/or provide other modifications to the site to enhance content related site health).

Each of these different buckets of scores is further described below. In one embodiment, scoring engine 206 is a component of content performance analytics engine 202, which includes a content scoring sub-component (e.g., a content scoring engine) for performing content scoring, a volume scoring sub-component (e.g., a volume scoring engine) for performing volume scoring, a uniqueness scoring sub-component (e.g., a uniqueness scoring engine) for performing uniqueness scoring, and a flux scoring sub-component (e.g., a flux scoring engine) for performing flux scoring.

Content Scoring—Content

In one embodiment, a content scoring sub-component (e.g., a content scoring engine, which can be implemented as a sub-component of thin content detector 212) for performing content scoring is provided. In an example implementation, the content scoring sub-component can be configured to identify a percent of keywords within a title and header that are used within a body content of a page of a web site.

For example, if a page body is missing keywords that are contained in the title and header, then this can hinder an opportunity to drive organic traffic to that page for those keywords. This results from that page generally not ranking as well for such keywords, by a typical search engine ranking, as such keywords are not also present in the body of the web page.

An example calculation of a content score that can be implemented by the content scoring sub-component (e.g., a content scoring engine) for performing content scoring is provided below.

Words=unigrams in heading+title=$w1w2w3 \ldots wN$ match(word,field)=min(1,$tf$(word,field))

match(word)=min(1,match(word,page_body)+match (word,crumb)+match(word,product_titles))

Content Score=[match($w1$)+match($w2$)+ ... match($wN$)]/$N$

A high score (e.g., a good score) resulting from an application of the above example calculation of a content score indicates that a majority of the words from the title and header show up within the page content. A low score (e.g., a bad score) resulting from an application of the above example calculation of a content score indicates that few of the words in the title and header show up within the page content. As such, the above example content score calculation can provide an effective and objective content measure of how well the content on a web page is correlated with (e.g., matches) content that is in a body of the web page, such as further described below.

In an example implementation, the content score is output as a percentage score type. As an example, suppose a title of a given web page on a merchant web site for apparel was "Red Ruffle Dress." If "Red" and "Dress" are used within the page body, but "Ruffle" is not, then the content score would be calculated to be 67% using the above example content score calculation.

In one embodiment, thin content detector 212 determines one or more remedial actions that can be performed based on a content score. For example, if a web page receives a low content score and is associated with relatively low or no web traffic and no revenue for a last n number of days (e.g., last 30 days, last 60 days, or some other number of days), then the recommended action can be to not index the page. As another example, if a web page receives a low content score and is associated with high web traffic, then the recommended action can be to add keywords found in the content body to the title and header of the web page, and/or include keywords from the title and header in the page content of the web page. As yet another example, if a web page receives a high content score, then the recommended action can be to leave the page alone (e.g., no actions recommended).

Content Scoring—Product Relevance

In one embodiment, a product relevance scoring is another type of content scoring that can be provided by the content scoring engine/component of the scoring engine (e.g., which can be implemented as a sub-component of thin content detector 212). In an example implementation, the content scoring sub-component can be configured to identify how relevant a set of products on a given page are in relation to a set of keywords found within the title and header of the page.

For example, if there is a mismatch between the products and the title and header on a given page, then this can hinder an opportunity to drive more organic traffic to the page.

An example calculation of a product relevance score that can be implemented by the content scoring sub-component (e.g., a content scoring engine) for performing content scoring, including product relevance scoring, is provided below.

Words=unique unigrams in heading+title= $w1w2w3 \ldots wN$ product_titles[ ]=products on the category page=$p1p2p3 \ldots pM$ match(word,product_title)=min(1,$tf$(word,product_title))

match(word)=match(word,$p1$)+match(word,$p2$)+ ... match(word,$pM$)

Product Relevance Score=[match($w1$)+match($w2$)+ ... match($wN$)]/$N*M$

A high score (e.g., a good score) resulting from an application of the above example calculation of a product relevance score indicates that there is a high degree of relevance between the title and header, and the product set on the page. A low score (e.g., a bad score) resulting from an application of the above example calculation of a product relevance score indicates that that there is a low degree of relevance between the title and header, and the product set on the page. As such, the above example content score calculation can provide an effective and objective content measure of how well the product set on a web page is correlated with (e.g., matches) the title and header of the web page, such as further described below.

In an example implementation, the product relevance score is output as a percentage score type. As an example, suppose a title and header of a given web page on a merchant web site for cookware are both "grey grill pan" and that there are four products on the page. Assume that the word "grey" appears in each of the four products, the word "grill" appears in just one of the four products, and the word "pan" appears in two of the four products. Applying the above product relevance score calculation in this example, the product relevance score (e.g., product relevance score portion of the content score) would be calculated to be 58.3%, which is calculated as follows: (4+4+2+2+1+1)/(6 words in title and header×4 products)=14/24=58.3%.

In one embodiment, thin content detector 212 determines one or more remedial actions that can be performed based on a product relevance score. For example, if a web page receives a low product relevance score and is associated with relatively low or no web traffic and no revenue for a last n number of days (e.g., last 30 days, last 60 days, or some other number of days), then the recommended action can be to not index the page. As another example, if a web page receives a low product relevance score and is associated with high web traffic, then the recommended action can be to update the title and header of the web page to better match the set of products on the page or to include additional product data on the landing page. As yet another example, if a web page receives a high product relevance score, then the recommended action can be to leave the page alone (e.g., no actions recommended).

Content Scoring—Page Relevance

In one embodiment, a page relevance scoring is another type of content scoring that can be provided by the content scoring engine/component of the scoring engine (e.g., which can be implemented as a sub-component of thin content detector 212). In an example implementation, the content scoring sub-component can be configured to identify how relevant the overall body content is in relation to a set of keywords found within the title and header of the page.

For example, if there is a mismatch between the content body and the title and header on a given page, then this can hinder an opportunity to drive more organic traffic to the page.

An example calculation of a page relevance score that can be implemented by the content scoring sub-component (e.g., a content scoring engine) for performing content scoring, including page relevance scoring, is provided below. Applying the below example page relevance score calculation, the page relevance score is generally reflective of how relevant a given heading and title are to the rest of the content of the page, with more emphasis towards a higher match.

An example web page is provided below.
{
   heading="iphone case"
   title="iphone case"
   crumb="mobile>accessories>iphone"
   product_titles=[
     "pink case",
     "black leather case",
   ]
   page_body="iphone accessories"
}

For example, to determine the relevance of "iphone case" to the rest of the above example web page, three matrices can be defined, as follows: boost (e.g., how much weight to give a match), squash (e.g., an upper limit on matches); and useTf (e.g., whether to consider the term frequency while matching).

Assuming that the following is used:
boost=page_body^1 crumb^2 product_tities^2
squash=page_body^2 crumb^2 product_tities^2
useTf=page_body^1 crumb^0 product_titles^0

Then, in this example, the page relevance score can be calculated as provided below.

```
page_relevance_score =
MultiplicativeScoreQuery (
    MultiplicativeScoreQuery (
        ScoreSquashingQuery (
            ScoreSquashingQuery (
                Tf (page_body:iphone) *1.0
            ) ~2.0
            ScoreSquashingQuery (
                ConstantScore (product_titles:iphone) *2.0
            ) ~2.0
            ScoreSquashingQuery (
                ConstantScore(crumb:iphone)*2.0
            ) ~2.0
        ) ~5.0
        +
        ScoreSquashingQuery(
            ScoreSquashingOuery(
                Tf(page_body:case)*1.0
            ) ~2.0
            ScoreSquashingQuery(
                ConstantScore(product_titles:case)*2.0
            ) ~2.0
            ScoreSquashingQuery(
                ConstantScore(crumb:case)*2.0
            ) ~2.0
        ) ~5.0
    ) ~(n + 2)
) ~1/1.7677668746
where
n = number of tokens
MultiplcativeScoreQuery(x) ~y = x*y
ScoreSquashingQuery(x) ~y = x*y/ (x + y)
page_relevance_score = ((
( (1*1.0) ~2.0 + (0*2.0) ~2.0 + (1*2.0) ~2.0 ) ~5.0 +
( (0*1.0) ~2.0 + (1*2.0) ~2.0 + (0*2.0) ~2.0 ) ~5.0 +
) / 4) / 1.7677668746
= ( (
(1/3 + 0 + 1) ~5 +
(0 + 1 + 0) ~5 +
) / 4 ) / 1.7677668746
= (1.3333333-5 + 1~5) / (4 * 1.7677668746)
= (1.05263156 + 0.833333333) / (4 * 1.7677668746)
= 0.266715725
Page relevance score = 0.266715725
```

A high score (e.g., a good score) resulting from an application of the above example calculation of a product relevance score indicates that there is a high degree of relevance between the title and header, and the content body of the page. A low score (e.g., a bad score) resulting from an application of the above example calculation of a product relevance score indicates that there is a low degree of relevance between the title and header, and the content body of the page. As such, the above example content score calculation can provide an effective and objective content measure of how well the content body of a web page is correlated with (e.g., matches) the title and header of the web page, such as further described below.

In an example implementation, the page relevance score is output as a percentage score type.

In one embodiment, thin content detector 212 determines one or more remedial actions that can be performed based on a page relevance score. For example, if a web page receives a low page relevance score and is associated with relatively low or no web traffic and no revenue for a last n number of days (e.g., last 30 days, last 60 days, or some other number of days), then the recommended action can be to not index the page. As another example, if a web page receives a low page relevance score and is associated with high web traffic, then the recommended action can be to update the title and header of the web page to better match the page content of the page or to modify the page content to better match the title and header. As yet another example, if a web page receives a high page relevance score, then the recommended action can be to leave the page alone (e.g., no actions recommended).

Volume Scoring—Number of Products

In one embodiment, a number of products scoring sub-component (e.g., a number of products engine, which can be implemented as a sub-component of the volume scoring engine, which is a sub-component of scoring engine 206) for performing volume scoring is provided. In an example implementation, the number of products scoring sub-component can be configured to identify a number of products that exist on category-like pages (e.g., pages with multiple products) of a web site.

For example, pages with low product counts that could potentially result in low traffic or may hold pages back from receiving more traffic can be identified using the disclosed volume scoring techniques.

An example calculation of a number of products scoring score that can be implemented by the number of products scoring sub-component (e.g., a number of products scoring engine) for performing number of products scoring is provided below.

product_titles[ ]=products on the category page=$p1p2p3 \ldots pM$

Number of products=$M$

A high score (e.g., a good score) resulting from an application of the above example calculation of a number of products score, assuming good relevance, represents a good page experience with a sufficient number of products. A low score (e.g., a bad score) resulting from an application of the above example calculation of a number of products score represents a poor or non-optimized page with relatively few to no products on the page. For example, in certain e-commerce site contexts, less than four products on a page correspond to relatively few products on the page.

In an example implementation, the number of products score is output as a number. For example, if a search result page has 10 products on the page, then the number of products score in this example can be calculated to be equal to 10.

In one embodiment, the volume scoring engine determines one or more remedial actions that can be performed based on a number of products score. For example, if a web page receives a low number of products score and is associated with relatively low or no web traffic and no revenue for a last n number of days (e.g., last 30 days, last 60 days, or some other number of days), then the recommended action can be to not index category pages with less than n number of products (e.g., less than four products or some other number of products). As another example, if a web page receives a low number of products score and is associated with high web traffic, then the recommended action can be to add more products to the page. As yet another example, if a web page receives a high number of products score, then the recommended action can be to leave the page alone (e.g., no actions recommended).

Volume Scoring—Content Volume

In one embodiment, a content volume scoring sub-component (e.g., a content volume scoring engine, which can be implemented as a sub-component of the volume scoring engine, which is a sub-component of scoring engine 206) for performing content volume scoring is provided. In an example implementation, the content volume scoring sub-component can be configured to identify a number of unique words on a page of a web site.

For example, pages with a small amount of non-repetitive, unique content that may result in low traffic or may hold pages back from receiving more traffic can be identified using the disclosed content volume scoring techniques.

An example calculation of a content volume score that can be implemented by the content volume scoring sub-component (e.g., a content volume scoring engine) for performing content volume scoring is provided below.

unigrams(field)=tokenize field on whitespace,remove stopwords,apply stemming

Content Volume=|uniq{unigrams(heading),unigrams (title),unigrams(page_body),unigrams(crumb), unigrams(product_titles)}|

A high score (e.g., a good score) resulting from an application of the above example calculation of a content volume score represents a page filled with a lot of non-repetitive, unique keyword content. A low score (e.g., a bad score) resulting from an application of the above example calculation of a content volume score represents a page that does not contain a lot of non-repetitive, unique keyword content.

In an example implementation, the content volume score is output as a number. For example, if the title has five words, the header has three words, and the page body has 50 words, then that would be a total of 58 words. However, out of those 58 words, assume only 20 of the words are unique. Thus, the content volume score in this example can be calculated to be equal to 20.

In one embodiment, volume scoring engine determines one or more remedial actions that can be performed based on a content volume score. For example, if a web page receives a low content volume score and is associated with relatively low or no web traffic and no revenue for a last n number of days (e.g., last 30 days, last 60 days, or some other number of days), then the recommended action can be to not index the page. As another example, if a web page receives a low content volume score and is associated with high web traffic, then the recommended action can be to add more content to the content body and add more products to the page (e.g., depending on the page type). As yet another example, if a web page receives a high content volume score, then the recommended action can be to leave the page alone (e.g., no actions recommended).

Volume Scoring—Document Length

In one embodiment, a document length volume scoring sub-component (e.g., a document length volume scoring engine, which can be implemented as a sub-component of the volume scoring engine, which is a sub-component of scoring engine 206) for performing document length volume scoring is provided. In an example implementation, the document length volume scoring sub-component can be configured to identify a total number of words on a page of a web site.

For example, pages with a small amount of content on the page that may result in low traffic or may hold pages back from receiving more traffic can be identified using the disclosed content volume scoring techniques.

An example calculation of a document length volume score that can be implemented by the document length volume scoring sub-component (e.g., a document length volume scoring engine) for performing document length volume scoring is provided below.

unigrams(field)=tokenize field on whitespace,remove stopwords,apply stemming

Document Length=|unigrams(heading)|+|unigrams (title)|+|unigrams(page_body)|+|unigrams (crumb)|+|unigrams(product_titles)|

A high score (e.g., a good score) resulting from an application of the above example calculation of a document length volume score represents a page filled with a lot of content. A low score (e.g., a bad score) resulting from an application of the above example calculation of a document length volume score represents a page that does not contain a lot of content.

In an example implementation, the document length volume score is output as a number. For example, if the title has five words, the header has five words, and the page body has 60 words, then that would be a total of 70 words. Thus, the document length volume score in this example can be calculated to be equal to 70.

In one embodiment, volume scoring engine determines one or more remedial actions that can be performed based on a document length volume score. For example, if a web page receives a low document length volume score and is associated with relatively low or no web traffic and no revenue for a last n number of days (e.g., last 30 days, last 60 days, or some other number of days), then the recommended action can be to not index the page. As another example, if a web page receives a low document length volume score and is associated with high web traffic, then the recommended action can be to add more content to the content body and add more products to the page (e.g., depending on the page type). As yet another example, if a web page receives a high document length volume score, then the recommended action can be to leave the page alone (e.g., no actions recommended).

Volume Scoring—Heading and Title Volume

In one embodiment, a heading and title volume scoring sub-component (e.g., a heading and title volume scoring engine, which can be implemented as a sub-component of the volume scoring engine, which is a sub-component of scoring engine 206) for performing heading and title volume scoring is provided. In an example implementation, the heading and title volume scoring sub-component can be configured to identify a number of unique words contained within the title tag and header on a page of a web site.

For example, pages where the title and header are either too short or too long that can impact the amount of traffic the page receives can be identified using the disclosed heading and title volume scoring techniques.

An example calculation of a heading and title volume score that can be implemented by the heading and title volume scoring sub-component (e.g., a heading and title volume scoring engine) for performing heading and title volume scoring is provided below.

$$\text{unigrams(field)} = \text{tokenize field on whitespace, remove stopwords, apply stemming}$$

$$\text{Heading Title Volume} = |\text{uniq}\{\text{unigrams(heading)}, \text{unigrams(title)}\}|$$

A high score (e.g., a bad score) resulting from an application of the above example calculation of a heading and title volume score indicates that the title and header together contain too many keywords and may represent a situation where the page topic is not sufficiently concise (e.g., usually ten words or more, such as for e-commerce sites). A medium score (e.g., a good score) resulting from an application of the above example calculation of a heading and title volume score indicates that the title and header together contain an adequate number of keywords (e.g., usually three to nine words, such as for e-commerce sites). A low score (e.g., a bad score) resulting from an application of the above example calculation of a heading and title volume score indicates that the title and header together do not contain many keywords and represents an opportunity to add more synonyms and variants to drive more organic traffic (e.g., usually two words or less, such as for e-commerce sites).

In an example implementation, the heading and title volume score is output as a number. As an example, suppose that for a given web page, the title is "Red Ruffle Dress|Domain.com" and the header is "Amazing Red Dress." The "Domain.com" is dropped and then the unique keywords are counted. In this example, Red, Ruffle, Dress, and Amazing are all unique keywords. Thus, the heading and title volume score in this example is calculated to be equal to 4.

In one embodiment, volume scoring engine determines one or more remedial actions that can be performed based on a heading and title volume score. For example, if a web page receives a high heading and title volume score and is associated with relatively low or no web traffic and no revenue for a last n number of days (e.g., last 30 days, last 60 days, or some other number of days), then the recommended action can be to remove keywords from the title and header to make them more concise (e.g., to make sure to focus on matching the title and header with the content body of the page). As another example, if a web page receives a low document length volume score and is associated with high web traffic, then the recommended action can be to add more content to the content body and add more products to the page (e.g., depending on the page type). As yet another example, if a web page receives a low document length volume score, then the recommended action can be to add more content to the page and add two to three (e.g., or some other number) of synonyms and other keyword variants to the title and header that match the page content. As yet another example, if a web page receives a medium document length volume score, then the recommended action can be to leave the page alone (e.g., no actions recommended).

Uniqueness Scoring—Overall Uniqueness Score

In one embodiment, an overall uniqueness scoring (e.g., or duplication scoring) sub-component (e.g., an overall uniqueness scoring engine, which can be implemented as a sub-component of duplicate content detector 208) for performing overall uniqueness scoring is provided. In an example implementation, the overall uniqueness scoring sub-component can be configured to identify how unique the overall content on a landing page (LP) is relative to a next closest duplicate page on a web site.

For example, a severity of the duplication for a given page that can impact traffic to this page as well as to other similar pages on the site can be identified using the disclosed overall uniqueness scoring techniques.

An example calculation of an overall uniqueness score that can be implemented by the overall uniqueness scoring sub-component (e.g., an overall uniqueness scoring engine) for performing overall uniqueness scoring is provided below.

$$\text{unigrams(field)} = \text{tokenize field on whitespace, remove stopwords, apply stemming}$$

$$|A \cap B| = \min(tf(\text{unigram1}, A), tf(\text{unigram1}, B)) + \min(tf(\text{unigram2}, A), tf(\text{unigram2}, B)) + \ldots$$

$$|A \cup B| = \max(tf(\text{unigram1}, A), tf(\text{unigram1}, B)) + \max(tf(\text{unigram2}, A), tf(\text{unigram2}, B)) + \ldots$$

$$\text{Jaccard similarity of sets } A \text{ and } B = \text{Sim}(A, B) = |A \cap B| / |A \cup B|$$

$$\text{Overall similarity score}(url1, url2) = [\text{Sim}(\text{heading}(url1), \text{heading}(url2))*5 + \text{Sim}(\text{title}(url1), \text{title}(url2))*5 + \text{Sim}(\text{page\_body}(url1), \text{page\_body}(url2))*3 + \text{Sim}(\text{crumb}(url1), \text{crumb}(url2))*3 + \text{Sim}(\text{product\_titles}(url1), \text{product\_titles}(url2))*5] / [5+5+3+3+5]$$

$$\text{Overall duplication score}(url1) = \max\{\text{Overall similarity score}(url1, url)\}$$

$$\text{Overall Similarity Score} = 1 - \text{Overall duplication score}(url1)$$

A high score (e.g., a good score) resulting from an application of the above example calculation of an overall uniqueness score indicates that the page has unique content and that there is little overlap of products and content to the next closest duplicate page. A low score (e.g., a bad score) resulting from an application of the above example calculation of an overall uniqueness score indicates that there is at least one page that is a very near or exact duplicate, where most of the products and content on the page overlap with the next closest page.

In an example implementation, the overall uniqueness score is output as a percentage. As an example, assume that a page A has a title "Brown Desk," a header "Brown Wood Desk," and a 100 word page body. Assume that a page B has a title "Brown Wood Desk," a header "Brown Wood Desk," and a 120 word page body that is largely the same as page A. Although there are some unique words on both pages, there is more than an 80% overlap of content when looking at the title, header, and page body. As a result, this would be flagged as a potential duplicate.

In one embodiment, duplicate content detector 208 determines one or more remedial actions that can be performed based on an overall uniqueness score. For example, if there is no traffic to the base page, then a recommended remedial action can be to canonicalize to the duplicative page with the majority of organic traffic.

Uniqueness Scoring—Body Duplicate Count

In one embodiment, a body duplicate scoring sub-component (e.g., a body duplicate counting/scoring engine, which can be implemented as a sub-component of duplicate content detector 208) for performing body duplicate scoring (e.g., body duplicate counting) is provided. In an example implementation, the body duplicate scoring sub-component can be configured to identify a number of pages on a web site that have body content excluding the HTML template that are near duplicates (e.g., 80% duplicative or using some other threshold for identifying duplicate body content) of the page being evaluated.

For example, how many pages exist with duplicate body content for the given page, which can impact traffic to this page as well as to other similar pages, can be identified using the disclosed body duplicate scoring techniques.

An example calculation of a body duplicate score that can be implemented by the body duplicate scoring sub-component (e.g., a body duplicate scoring engine) for performing body duplicate scoring is provided below.

unigrams(field)=tokenize field on whitespace,remove stopwords,apply stemming $|A \cap B|$=min(tf(unigram1,$A$),tf(unigram1,$B$))+min(tf(unigram2,$A$),tf(unigram2,$B$))+ . . .

$|A \cup B|$=max(tf(unigram1,$A$),tf(unigram1,$B$))+max(tf(unigram2,$A$),tf(unigram2,$B$))+ . . .

Jaccard similarity of sets $A$ and $B$=Sim($A$,$B$)=$|A \cap B|/|A \cup B|$Page body duplicates(url1)={url:Sim(page_body(url1,url))>=0.8}

Page Body Duplicate Count=|Page body duplicates(url1)|

A zero score (e.g., a good score) resulting from an application of the above example calculation of a body duplicate score indicates that the page has no body content duplication issue for the page. A non-zero score (e.g., a bad score) resulting from an application of the above example calculation of a body duplicate score indicates a body content duplication issue exists for the page.

In an example implementation, the body duplicate score is output as a number (e.g., a number corresponding to the body duplicate count for the analyzed page of the web site). As an example, assume that the page body content on page A is found to be at least 80% duplicative of the page body content on five other URLs (e.g., five other pages of the site). The body duplicate score in this example would be calculated to be equal to 5.

In one embodiment, duplicate content detector 208 determines one or more remedial actions that can be performed based on a body duplicate score. For example, if there is no traffic to the base page, then a recommended remedial action can be to canonicalize to the duplicative page with the majority of organic traffic. If the body duplicate score for the page is a low score, and the page is associated with relatively low or no web traffic for a last n number of days (e.g., last 30 days, last 60 days, or some other number of days), then the recommended action can be to add unique content to differentiate the page from other pages on the site.

Uniqueness Scoring—Exact Title Duplicate Count

In one embodiment, an exact title duplicate scoring sub-component (e.g., an exact title duplicate scoring engine, which can be implemented as a sub-component of duplicate content detector 208) for performing exact title duplicate scoring is provided. In an example implementation, the exact title duplicate scoring sub-component can be configured to identify a number of pages on a web site that have titles that are exact duplicates of the page being evaluated.

For example, how many pages exist with duplicate titles for the given page, which can impact traffic to this page as well as to other similar pages, can be identified using the disclosed exact title duplicate scoring techniques.

An example calculation of an exact title duplicate score that can be implemented by the exact title duplicate scoring sub-component (e.g., an exact title duplicate scoring engine) for performing exact title duplicate scoring is provided below.

unigrams(field)=tokenize field on whitespace,remove stopwords,apply stemming $|A \cap B|$=min(tf(unigram1,$A$),tf(unigram1,$B$))+min(tf(unigram2,$A$),tf(unigram2,$B$))+ . . .

$|A \cup B|$=max(tf(unigram1,$A$),tf(unigram1,$B$))+max(tf(unigram2,$A$),tf(unigram2,$B$))+ . . .

Jaccard similarity of sets $A$ and $B$=Sim($A$,$B$)=$|A \cap B|/|A \cup B|$

Title duplicates(url1)={url:Sim(title(url1,url))==1}

Exact Title Duplicate Count=|Title duplicates(url1)|

A zero score (e.g., a good score) resulting from an application of the above example calculation of an exact title duplicate score indicates that the page has no title tag duplication issue for the page. A non-zero score (e.g., a bad score) resulting from an application of the above example calculation of an exact title duplicate score indicates a title tag duplication issue exists for the page.

In an example implementation, the exact title duplicate score is output as a number. As an example, assume that a title on page A is "Pretty Red Dress and Blue Dress" and other page B is identified that has a duplicate title. In particular, if page B has a title that is "Pretty Red Dress, Blue Dress," then this would be flagged as a duplicate title. As a result, in this example, the exact title duplicate score would be calculated to be equal to 1 as only one exact duplicate title was identified on another page of the site.

In one embodiment, duplicate content detector 208 determines one or more remedial actions that can be performed based on an exact title duplicate score. For example, if there is no traffic to the base page, then a recommended remedial action can be to update the title tag to make it more unique relative to the other duplicate pages.

Uniqueness Scoring—Exact Header Duplicate Count

In one embodiment, an exact header duplicate scoring sub-component (e.g., an exact header duplicate count engine, which can be implemented as a sub-component of duplicate content detector 208) for performing exact header duplicate scoring is provided. In an example implementation, the exact header duplicate scoring sub-component can be configured to identify a number of pages on a web site that have headers that are exact duplicates of the page being evaluated.

For example, how many pages exist with a duplicate header for the given page, which can impact traffic to this page as well as to other similar pages, can be identified using the disclosed exact header duplicate scoring techniques.

An example calculation of an exact header duplicate score that can be implemented by the exact header duplicate scoring sub-component (e.g., an exact header duplicate scoring engine) for performing exact header duplicate scoring is provided below.

unigrams(field)=tokenize field on whitespace, remove stopwords, apply stemming $|A \cap B|= \min(tf(\text{unigram1},A), tf(\text{unigram1},B)) + \min(tf(\text{unigram2},A), tf(\text{unigram2},B)) + \ldots$ $|A \cup B|= \max(tf(\text{unigram1},A), tf(\text{unigram1},B)) + \max(tf(\text{unigram2},A), tf(\text{unigram2},B)) + \ldots$ Jaccard similarity of sets $A$ and $B = \text{Sim}(A,B) = |A \cap B|/|A \cup B|$ Heading duplicates(url1) = {url:Sim(heading(url1,url)) ==1}

Exact Heading Duplicate Count = |Heading duplicates (url1)|

A zero score (e.g., a good score) resulting from an application of the above example calculation of an exact header duplicate score indicates that the page has no header (e.g., header tag) duplication issue for the page. A non-zero score (e.g., a bad score) resulting from an application of the above example calculation of an exact header duplicate score indicates a header duplication issue exists for the page.

In an example implementation, the exact header duplicate score is output as a number. As an example, assume that a header on page A is "Pretty Red Dress and Blue Dress" and other page B is identified that has a duplicate header. In particular, if page B has a header that is "Pretty Red Dress, Blue Dress," then this would be flagged as a duplicate header. As a result, in this example, the exact header duplicate score would be calculated to be equal to 1 as only one exact duplicate header was identified on another page of the site.

In one embodiment, duplicate content detector 208 determines one or more remedial actions that can be performed based on an exact header duplicate score. For example, if there is no traffic to the base page, then a recommended remedial action can be to update the header to make it more unique relative to the other duplicate pages.

Flux Scoring—Overall Max Flux Score

In one embodiment, an overall max flux scoring sub-component (e.g., an overall max flux scoring engine, which can be implemented as a sub-component of flux scoring engine of scoring engine 206) for performing overall max flux scoring is provided. In an example implementation, the overall max flux scoring sub-component can be configured to capture a rate of change of content on a page over the last n number of days (e.g., over the last 30 or some other number of days) and displays the highest occurrence of that change.

For example, a high content fluctuation on a web page that may result in traffic to decline or not realize its full potential can be identified using the disclosed overall max flux scoring techniques. In some cases, if content on the web page frequently changes, then such content may not yield optimal organic search results as the newly added content may not have been crawled yet by various search engines.

An example calculation of an overall max flux score that can be implemented by the overall max flux scoring sub-component (e.g., an overall max flux scoring engine) for performing overall max flux scoring is provided below.

unigrams(field)=tokenize field on whitespace, remove stopwords, apply stemming $|A \cap B|= \min(tf(\text{unigram1},A), tf(\text{unigram1},B)) + \min(tf(\text{unigram2},A), tf(\text{unigram2},B)) + \ldots$ $|A \cup B|= \max(tf(\text{unigram1},A), tf(\text{unigram1},B)) + \max(tf(\text{unigram2},A), tf(\text{unigram2},B)) + \ldots$ Jaccard similarity of sets $A$ and $B = \text{Sim}(A,B) = |A \cap B|/|A \cup B|$ flux(strA,strB) = 1 − Sim(strA,strB)

flux(snapshot1,snapshot2) = [5*flux(heading1,heading2)+5*flux(title1,title2)+3*flux(page_body1,page_body2)+3*flux(crumb1,crumb2)+5*flux(product_titles1,product_titles2)]/(5+5+3+3+5)

flux(day1,day2) = flux(snapshot of data on day1, snapshot of data on day2)

Flux score = max{flux(week($i$−4),week($i$)), flux(week($i$−3),week($i$)), flux(week($i$−2),week($i$)), flux(week($i$−1),week($i$))}

A high score (e.g., a bad score) resulting from an application of the above example calculation of an overall max flux score indicates that most of the content on the page changes frequently. For example, this threshold for frequency of content change can depend on the type of the web site (e.g., certain types of e-commerce sites may have different rates of content change, such as a clearance/sale site versus other types of e-commerce sites), but in a typical e-commerce site, a high score is anything above 30% (e.g., above 30% of the content changed within the last 30 days). A low score (e.g., a good score) resulting from an application of the above example calculation of an overall max flux score indicates that the content on the page does not change frequently.

In an example implementation, the overall uniqueness score is output as a percentage. As an example, assume that the content of a given web page today has 100 words. Assume that one week from now, the web page still has 100 words, but 45% of the content on the page has changed. The overall max flux score in this example would be calculated to be equal to 45%.

In one embodiment, the flux scoring engine determines one or more remedial actions that can be performed based on an overall max flux score. For example, if a web page receives a high overall max flux score (e.g., above 30%) and is associated with relatively low or no web traffic for a last n number of days (e.g., last 30 days, last 60 days, or some other number of days), then the recommended action can be to add more evergreen content (e.g., content that generally stays fresh and does not require frequent updating, which is generally understood to refer to sustainable and lasting content that can continue to be relevant content without frequent updating) to the page.

Flux Scoring—Max Product Flux Score

In one embodiment, a max product flux scoring sub-component (e.g., a max product flux scoring engine, which can be implemented as a sub-component of the flux scoring engine, which is a sub-component of scoring engine 206) for performing max product flux scoring is provided. In an example implementation, the max product flux scoring sub-component can be configured to capture the changes to the amount as well as the specific product set on a given category page over the last n number of days (e.g., over the last 30 or some other number of days) and displays the highest occurrence of that change. In some implementations, this is generally only applicable to category-like pages with many products.

For example, a high product fluctuation on a web page that may result in traffic to decline or not realize its full potential can be identified using the disclosed max product flux scoring techniques. In some cases, the disclosed max product flux scoring techniques can also identify high product churn from a merchandising/inventory standpoint for a web site (e.g., e-commerce site).

An example calculation of a max product flux score that can be implemented by the max product flux scoring sub-component (e.g., a max product flux scoring engine) for performing max product flux scoring is provided below.

$A, B$ = lists of elements $|A \cap B|$ = min(freq(elem1,$A$),freq(elem1,$B$))+min(freq(elem2,$A$),freq(elem2,$B$))+ . . .

$|A \cup B|$ = max(freq(elem1,$A$),freq(elem1,$B$))+max(freq(elem2,$A$),freq(elem2,$B$))+ . . .

Jaccard similarity of lists $A$ and $B$ = Sim($A,B$) = $|A \cap B|/|A \cup B|$ flux(list$A$,list$B$) = 1 − Sim(list$A$,list$B$)

product flux(day1,day2) = flux(product_titles[ ] in snapshot of data on day1,product_titles[ ] in snapshot of data on day2)

Product Flux score=max{product flux(week($i$−4),week($i$)),product flux(week($i$−3),week($i$)),product flux(week($i$−2),week($i$)),product flux(week($i$−1),week($i$))}

A high score (e.g., a bad score) resulting from an application of the above example calculation of a max product flux score indicates that most of the products on the page change frequently. For example, this threshold for frequency of product change can depend on the type of the web site (e.g., certain types of e-commerce sites may have different rates of product related content change, such as a clearance/sale site versus other types of e-commerce sites), but in a typical e-commerce site, a high score is anything above 30% (e.g., above 30% of the product related content changed within the last 30 days). A low score (e.g., a good score) resulting from an application of the above example calculation of a max product flux score indicates that the products on the page do not change frequently.

In an example implementation, the max product flux score is output as a percentage. As an example, assume that products A, B, and C are on a given web page today. Assume that one week from now, the web page now contains products A, D, and E. The max product flux score in this case would be calculated to be equal to 66%.

In one embodiment, the flux scoring engine determines one or more remedial actions that can be performed based on a max product flux score. For example, if a web page receives a high max product flux score (e.g., above 30%) and is associated with relatively low or no web traffic for a last n number of days (e.g., last 30 days, last 60 days, or some other number of days), then the recommended action can be to add more stable products to the page (e.g., products that are less frequently changed on the site) or to notify the merchant (e.g., the merchant that is the merchandiser of the merchant web site) to purchase more inventory.

Flux Scoring—Max Volume Flux Score and Min Volume Flux Score

In one embodiment, a max volume flux scoring and min volume flux scoring sub-component (e.g., a max volume flux scoring and min volume flux scoring engine, which can be implemented as a sub-component of the flux scoring engine, which is a sub-component of scoring engine 206) for performing max volume flux scoring and min volume flux scoring is provided. In an example implementation, the max volume flux scoring and min volume flux scoring sub-component can be configured to capture the changes to the amount of content on a given web page over the last n number of days (e.g., over the last 30 or some other number of days) and displays the highest occurrence of that change.

For example, a sudden drop in content volume on a page that may result in a traffic decline can be identified using the disclosed min volume flux scoring techniques. As another example, a sudden increase in content volume on the page that may result in a traffic increase can be identified using the disclosed max volume flux scoring techniques.

An example calculation of a max volume flux score and min volume flux score that can be implemented by the max volume flux scoring and min volume flux scoring sub-component (e.g., a max volume flux scoring and min volume flux scoring engine) for performing max volume flux scoring and min volume flux scoring is provided below.

unigrams(field) = tokenize field on whitespace,remove stopwords,apply stemming

Document Length(snapshot) = |unigrams(heading)|+|unigrams(title)|+|unigrams(page_body)|+|unigrams(crumb)|+|unigrams(product_titles)|

Volume stability(snapshot1,snapshot2) = |Document Length (snapshot2)−Document Length(snapshot1)|/|Document Length (snapshot1)|

Volume flux(snapshot1,snapshot2) = 1 − Volume stability(snapshot1,snapshot2)

Max Volume Flux score=max{Volume flux(week($i$−4),week($i$)),Volume flux(week($i$−3),week($i$)),Volume flux(week($i$−2),week($i$)),Volume flux(week($i$−1),week($i$))}

Min Volume Flux score=min{Volume flux(week($i$−4),week($i$)),Volume flux(week($i$−3),week($i$)),Volume flux(week($i$−2),week($i$)),Volume flux(week($i$−1),week($i$))}

A high score (e.g., a good score) resulting from an application of the above example calculation of a max volume flux score and min volume flux score indicates that the content on the page significantly increased and could result in a score in excess of 100%. A low score (e.g., a bad score) resulting from an application of the above example calculation of a max volume flux score and min volume flux score indicates that the content on the page significantly decreased and could result in a score below 0%.

In an example implementation, the max volume flux score and min volume flux score is output as a percentage. As an example, assume the content on a given web page today is 500 words. Assume that one week from now, the content on the page drops to 200 words. In this example, the min_volume_flux_score would be calculated to be equal to −60%, and the max_flux_volume_score would be calculated to be equal to 0%.

In one embodiment, flux scoring engine determines one or more remedial actions that can be performed based on a max volume flux score and min volume flux score. For example, if a web page receives a low score (e.g., below 0%) and is associated with relatively low or no web traffic for a last n number of days (e.g., last 30 days, last 60 days, or some other number of days), then the recommended action can be to add more evergreen content to the page.

HTML Error Identifier

In one embodiment, an HTML error identifier component 204 (e.g., an HTML error identifier engine) of content performance analytics system 102 is provided. For example, the HTML error identifier can identify various HTML related errors on pages of a site. In some cases, the HTML error identifier can identify one or more URLs of a site that appear to be error pages (e.g., pages that have no content or products on a merchant web site). As another example, a web site can be created with an incorrect canonicalization (e.g., redirects, loops, errors in tagging, etc.), which can make the web site more difficult to navigate and/or search, and the HTML error identifier can be configured to identify such incorrect canonicalization on a web site.

Link Extractor

In one embodiment, a link extractor component 210 (e.g., a link extractor engine) of content performance analytics system 102 is provided. For example, the link extractor can extract links from pages of a web site and determine a link structure of the web site. The disclosed link extractor techniques can be used to improve a discoverability of web pages through a link structure of a web site (e.g., improving link structure, such as by identifying core pages and linking to other (non-core) pages from core pages). The discoverability of web pages through a link structure of a web site will be further described below with respect to FIG. 3.

As will be apparent to one of ordinary skill in the art, each of these engines in FIG. 2 can be implemented, for example, as distinct or integrated software components, which can include module(s), package(s), and/or other sub-components to provide an executable computer program that can perform these described functions when executed on a processor, and can be implemented using a programming language such as Java, Python, Objective C, and/or other programming languages.

CPA Front-End Service

As also shown in FIG. 2, a CPA front-end service 260 is in communication with reporting data store 250. For example, CPA front-end service can be implemented as a web user interface that facilitates user interactions, such as a user 270 (e.g., an admin of a merchant web site who is an authorized user to access the CPA reports and to manage content related site health issues for the merchant web site), to access CPA reports (e.g., over the Internet, such as using a secure protocol, such as HTTPS or another secure protocol). Example CPA reports are further described below. In some cases, the user can use the CPA front-end service to configure and/or authorize recommended remedial actions for a web site (e.g., the merchant site that has been analyzed by CPA system 102 using the disclosed content performance analytics techniques), such as further described below.

In an example implementation, recommended remedial actions, such as described above and/or with respect to other recommended remedial actions described herein, can be automatically implemented (e.g., with web site owner/admin approval or configuration for default remedial actions to be automatically implemented) by programmatically adding content and/or links to one or more web pages of a web site based on recommendations using, for example, widgets (e.g., CPA provider widgets, such as a related products widget, a related searches widget, and/or other widgets, which can communicate with the CPA system via an API) to dynamically add content/links and/or to perform other content related actions to content of the site. For example, a dashboard user interface (UI) (e.g., a web graphical user interface (GUI)), accessible by a CPA user 270 via a CPA front-end service 260, can be provided to allow an administrator (admin) of the web site to approve or not approve of recommended remediation actions, which can then be automatically remediated using such techniques, and/or to provide the admin with a tool that facilitates a selection of content to include and/or a manual override of suggested content that can be used for the automatically generated content for implementing the recommended remediation actions, such as adding automatically generated content for a page using one or more widgets. An example implementation of automatically performed remedial actions using one or more widgets is described below with respect to FIG. 10.

Figure 3:
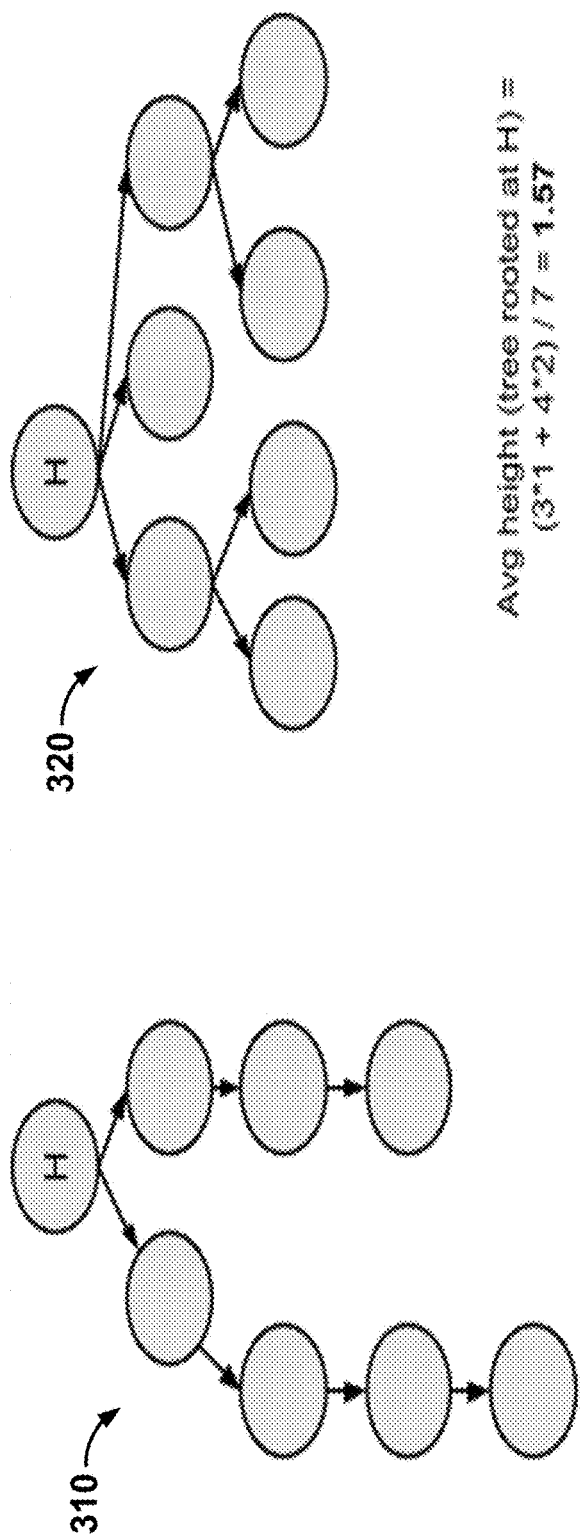
FIG. 3 are example graphs for illustrating a link graph optimization to improve a crawlability of a web site from a search engine's perspective in accordance with some embodiments.

Improving Discoverability of Web Pages on a Web Site Through a Link Structure of the Web Site FIG. 3 are example graphs for illustrating a link graph optimization to improve a crawlability of a web site from a search engine's perspective in accordance with some embodiments. In an example implementation, link graph optimization techniques (e.g., implemented using link extractor engine as described above) can be performed for improving the crawlability of a web site (e.g., a merchant web site) from a search engine's perspective. As a result, improving the crawlability of the web site from a search engine's perspective (e.g., by using a link structure for the web site that is more likely to result in more effective crawling by search engine crawlers) can result in improved organic search results for the web site.

Referring to FIG. 3, a graph 310 provides a simplistic model of a web site link structure for a first web site, and a graph 320 provides a simplistic model of a web site link structure for a second web site. Assume that for a breadth-first search (BFS) tree of a web site, a BFS begins at a root (e.g., at the entry point) to the web site. The root nodes (e.g., root objects) of the first graph and the second graph are each shown as the nodes labeled H for home page (e.g., node H) in graph 310 and 320.

In one embodiment, an average height of the BFS tree rooted at a node H can be calculated as shown below.

$$AvgHeight(H) = \frac{\sum_{i=1}^{n} depth_i}{N}$$

Applying the above average height equation to graph 310, an average height (H) is calculated to be equal to (2×1+2×2+2×3+1×4)/7=2.28.

Applying the above average height equation to graph 320, an average height (H) is calculated to be equal to (3×1+4×2)/7=1.57.

For example, a well-structured web site typically has many pages closer to the root node.

In a scenario with multiple entry points to the web site (e.g., multiple URLs receiving organic traffic/shared via social sites/networks, etc.), an average height of the BFS tree can be computed, weighted by the traffic at each entry point, as shown below.

$$Weighted\ height = \frac{\sum_{i=1}^{k} AvgHeight(n_i) * t_i}{\sum_{i=1}^{k} t_i}$$

where $n_1\ n_2\ n_3\ \ldots\ n_k$ are the entry points receiving traffic $t_1\ t_2\ t_3\ \ldots\ t_k$ This can also be written as the following:

$$\sum_{j=1}^{N} \frac{\sum_{i=1}^{k} D(i,j) * T(i)}{\frac{\sum_{i=1}^{k} T(i)}{N}}$$

In one embodiment, the link graph for a web site can be improved for the web site by adding links to the web site. For example, an average depth/height of a graph of the link structure of the web site can decrease by adding links to the web site using CPA provider widgets to add links to the web site (e.g., a related searches widget such as described above, a related products widget such as described above, and/or other widgets can be used to add links to the web site).

Below is an example calculation that illustrates the impact of adding links to improve/decrease the average depth/height of a graph of the link structure of the web site.

$$\text{Impact} = \frac{\text{Weighted\_Height(without adding links)} - \text{Weighted\_Height(with adding links)}}{\text{Weighted\_Height(with adding links)}}$$

For example, the above calculation impact can also be used to show an impact of the improvement resulting from the CPA provider implementing these adding links techniques to subscriber web sites by decreasing the average depth/height of a graph of the link structure of the respective subscriber web sites (e.g., using CPA provider widgets to add such links to each of the respective subscriber web sites).

CPA Reports and Recommendations

In one embodiment, in addition to facilitating search and filter operations on the various scores based on the disclosed CPA techniques described above, the CPA system generates several reports (e.g., also generally referred to herein as CPA reports) that highlight specific issues (e.g., including various canned/pre-configured reports and, in some cases, customized reports).

For example, these reports can include actionable recommendations such that a user can download these reports, which are formatted in a way for the user to take action to make changes on their site. As another example, these reports can include actionable recommendations such that if an authorized user approves the CPA system to automatically implement a recommended remediation action, then the CPA system can perform the recommended remediation action using various techniques described above.

Below is a sample of reports that the CPA system can generate using the various techniques described above in accordance with some embodiments.

A missing keywords report can identify pages of a site that are missing keywords from the title and H1 within the page body.

A low content volume report can identify pages of a site that have a low amount of unique words on the page.

A low page relevance report can identify pages of a site where relation of overall body content to keywords within the title/header is low.

A low product relevance report can identify pages of a site where relation of the set of products to the keywords within the title/header is low.

A duplication report can identify all URLs of a site that have duplicative page elements with other pages on the site. For example, each row in these reports can be comparing one URL to only one other URL (i.e., providing a 1-to-1 comparison). These reports can examine the following example scenarios: (1) duplicate title and/or header, and duplicate page body; (2) duplicate title and/or header, and unique page body; and/or (3) unique title and/or header, and duplicate page body.

A low page body uniqueness report can identify pages of a site that have at least one other page where page body is at least, for example, 80% (e.g., or worse) duplicate.

A low heading uniqueness report can identify pages of a site that have at least one other page where the heading is an exact duplicate.

A low title uniqueness report can identify pages of a site that have at least one other page where the title is an exact duplicate.

A high overall flux report can identify URLs of a site that have a high content churn over a recent period (e.g., a last 30 days), have a lower than average page relevance, and have a decent document length. For example, these are generally pages that can benefit from more stable content with relevant terms from the title/header added to them.

A high product flux report can identify pages of a site where the specific product set has significantly changed over a recent period (e.g., a last 30 days).

A high volume flux report can identify pages of a site where the overall number of words on a page has significantly increased over a recent period (e.g., a last 30 days).

A low volume flux report can identify pages of a site where the overall number of words on a page has significantly decreased over a recent period (e.g., a last 30 days).

An under-optimized pages report can identify URLs of a site that are under optimized from a content standpoint. For example, the report can focus on the bottom 20% of pages in terms of content volume, less than three products, and little to no fluctuation of content. Generally, these are pages that can use a boost in content if they receive traffic or can be removed if they do not over, for example, the last 12 months.

An error pages report can identify URLs of a site that appear to be error pages (e.g., pages that have no content or products).

As described above, the content performance analytics system can perform the disclosed content performance analytics techniques to generate various reports to provide information and recommended remediation actions based on a content related health of an analyzed web site. Various reports and screens for outputting such reports will now be described.

Figure 4:
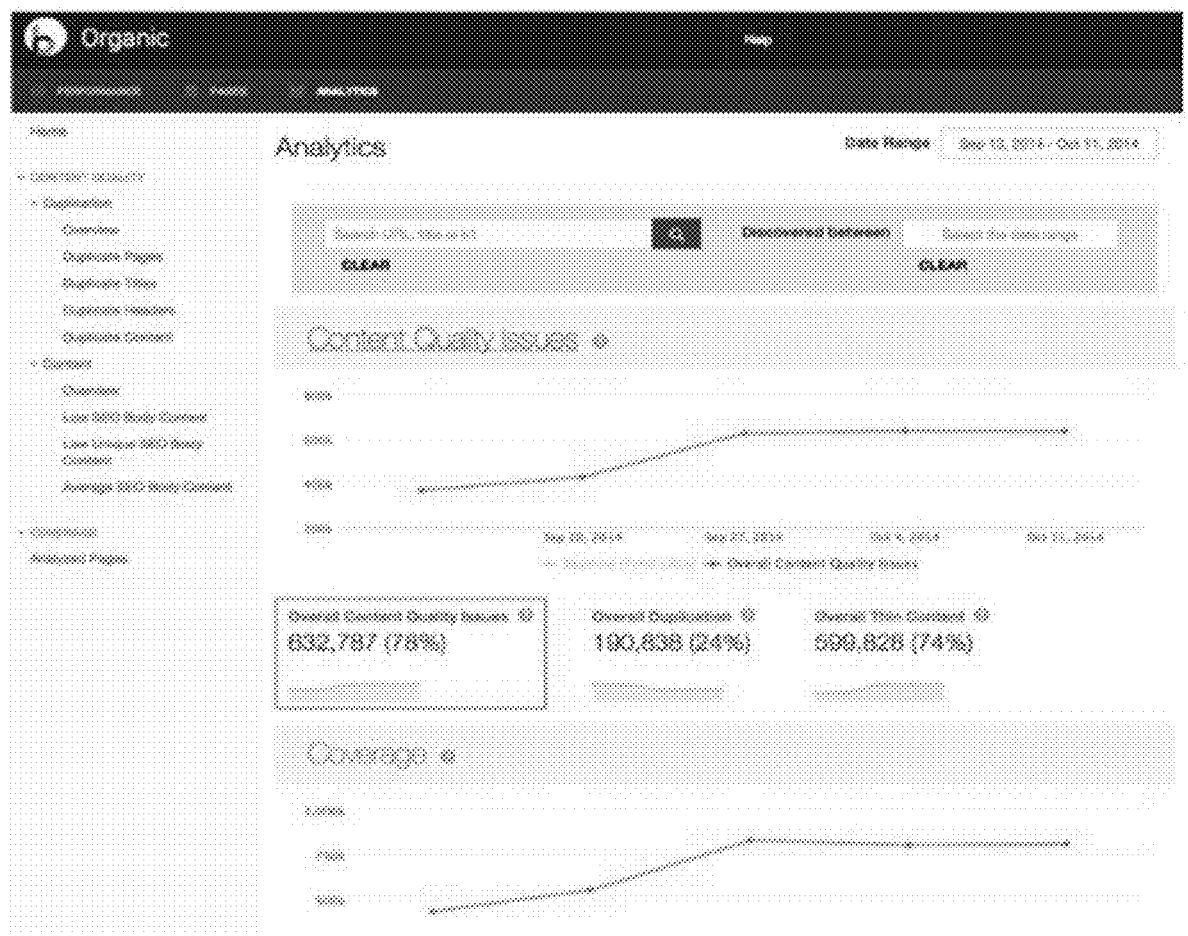
FIG. 4 illustrates an embodiment of a home reporting screen of the content performance analytics system that summarizes various content related site issues identified using the disclosed techniques.

FIG. 4 illustrates an embodiment of a home reporting screen of the content performance analytics system that summarizes various content related site issues identified using the disclosed techniques. As shown, a home reporting screen 400 is shown as a graphical user interface (GUI) screen that illustrates various graphs and trends for overall content health (e.g., overall content quality issues), duplication (e.g., overall duplication), and thin content (e.g., overall thin content).

In an example implementation of a user interface for the content performance analytics system, when a user (e.g., authorized user, such as an admin for a given merchant web site that subscribes to the CPA service) logs into the CPA system, a home reporting screen (e.g., home reporting screen 400) is provided by the CPA system. A user can perform various actions using the home screen, such as the below described actions.

A user can access various reports (e.g., canned reports). For example, a canned reports dropdown menu includes a list of the various reports that a user can access. For example, these can be the same reports that are available manually. A report can be displayed for a selected data range.

For example, a user can access the canned reports for the various date ranges that have been performed to date. Each week, the latest reports can be added and the user can access the latest reports by selecting the most recent date.

In an example implementation, users can filter the overall report to generate a customized report(s). For example, the overall report can be filtered on one or more of the following: Title, URL, or Header of the Page. A user can also filter the graphs and reports by entering in keywords or a URL pattern. As another example, a user can filter by when a URL was first discovered by the CPA system.

In one embodiment, a content relevance is provided that represents the average content score for all the URLs of a web site in the report. For example, the content score identifies the percent of keywords within the title and header that are used within the body content of the page. The product relevance represents the average product relevance score for all the URLs of the web site in the report. The product relevance score generally identifies how relevant the set of products on a given page are in relation to the keywords found within the title and header. Page relevance represents the average page relevance score for all the URLs of the web site in the report. The page relevance score generally identifies how relevant the overall body content is in relation to the keywords found within the title and header.

In one embodiment, the content represents the average number of words (e.g., document length score) found on each page for all the URLs of the web site in the report. A low SEO body content can be used to display all the pages that are below a certain threshold of words on the page. An average SEO body content can be used to represent the average number of unique words (e.g., content volume) found on each page for all the URLs of the web site in the report. The content volume score generally identifies the number of unique words on a given page. A missing title field/display can be used to indicate the number of pages missing title tags. Also, a missing heading field/display can be used to indicate the number of pages missing headers (e.g., H1 tag).

In one embodiment, a flux report can be generated by the CPA system. For example, the flux can be determined by analyzing each of the URLs in the report, and the flux score represents the average rate of change of the page content over the last, for example, 30 days and displays the highest occurrence of that change. The product flux score can be used to capture the average changes to the amount as well as the specific product set on a given category page over, for example, a 30-day period and displays the highest occurrence of that change. As similarly discussed above, the product flux score is typically only applicable to category-like pages with many products.

In one embodiment, the CPA system can download one or more reports to a user. For example, a download the full report option can be displayed on a user interface generated by the CPA system, which provides users with the ability to download the report that was generated based on the user selections.

Figure 5:
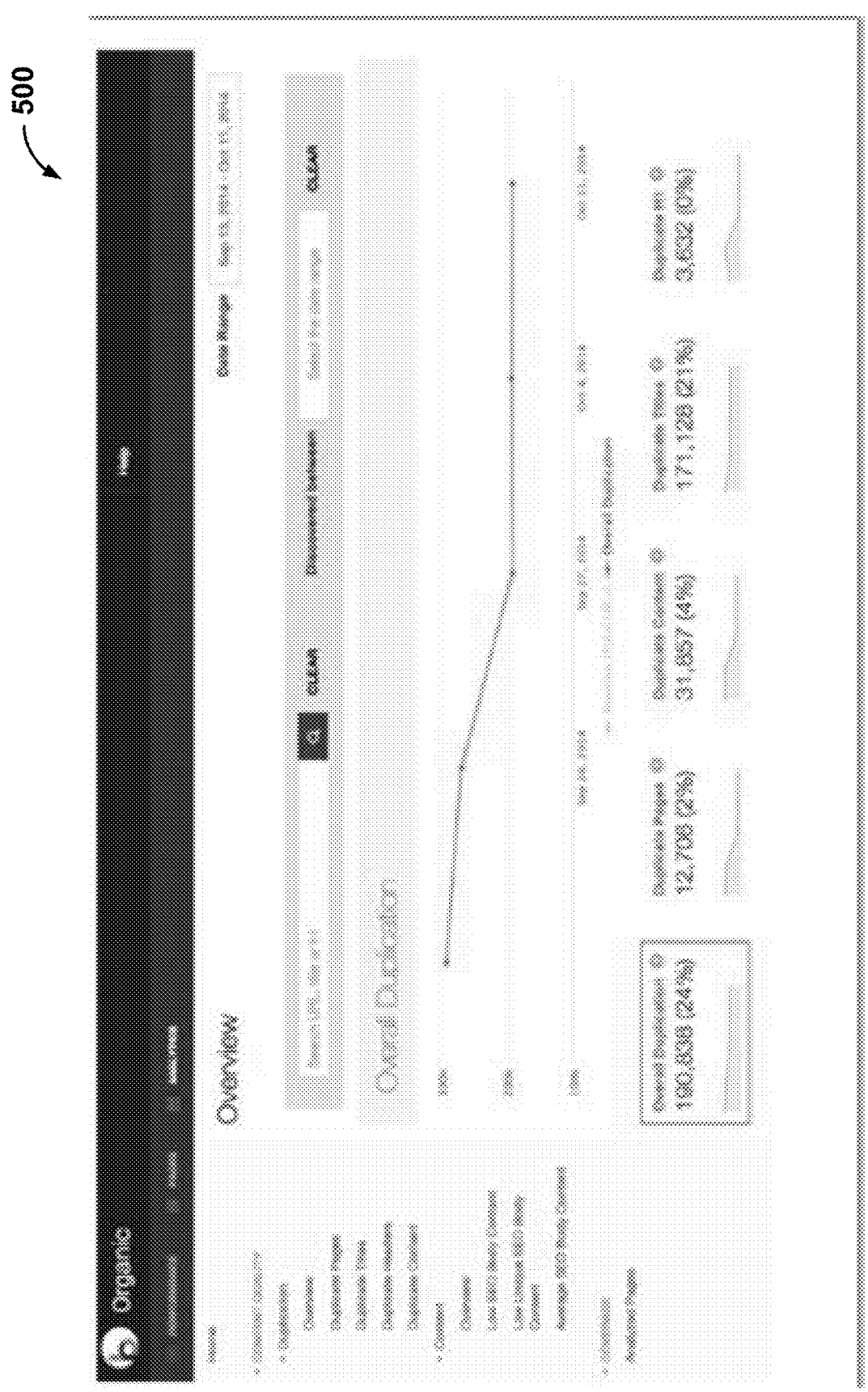
FIG. 5 illustrates an embodiment of a duplication reporting screen of the content performance analytics system that summarizes various duplications of content related site issues identified using the disclosed techniques.

FIG. 5 illustrates an embodiment of a duplication reporting screen of the content performance analytics system that summarizes various duplications of content related site issues identified using the disclosed techniques. As shown, a duplication reporting screen 500 illustrates various graphs and trends for duplication (e.g., overall duplication, duplicate pages, duplicate content, duplicate titles, and duplicate headers (H1)).

In one embodiment, the duplication represents the number of URLs in the report that are considered to be unique, specifically URLs that do not have a title, header, page body, or overall duplication issue. For example, overall duplicates can be used to identify the number of pages in the report that are near duplicates (e.g., 90% duplicative) of the page being evaluated. Body duplicates can be used to report the number of pages in the report that have body content that are near duplicates (e.g., 90% duplicative) of the page being evaluated. Title duplicates can be used to report the number of pages in the report that have titles that are exact duplicates of the page being evaluated. Heading duplicates can be used to report the number of pages in the report that have headers that are exact duplicates of the page being evaluated.

Figure 6:
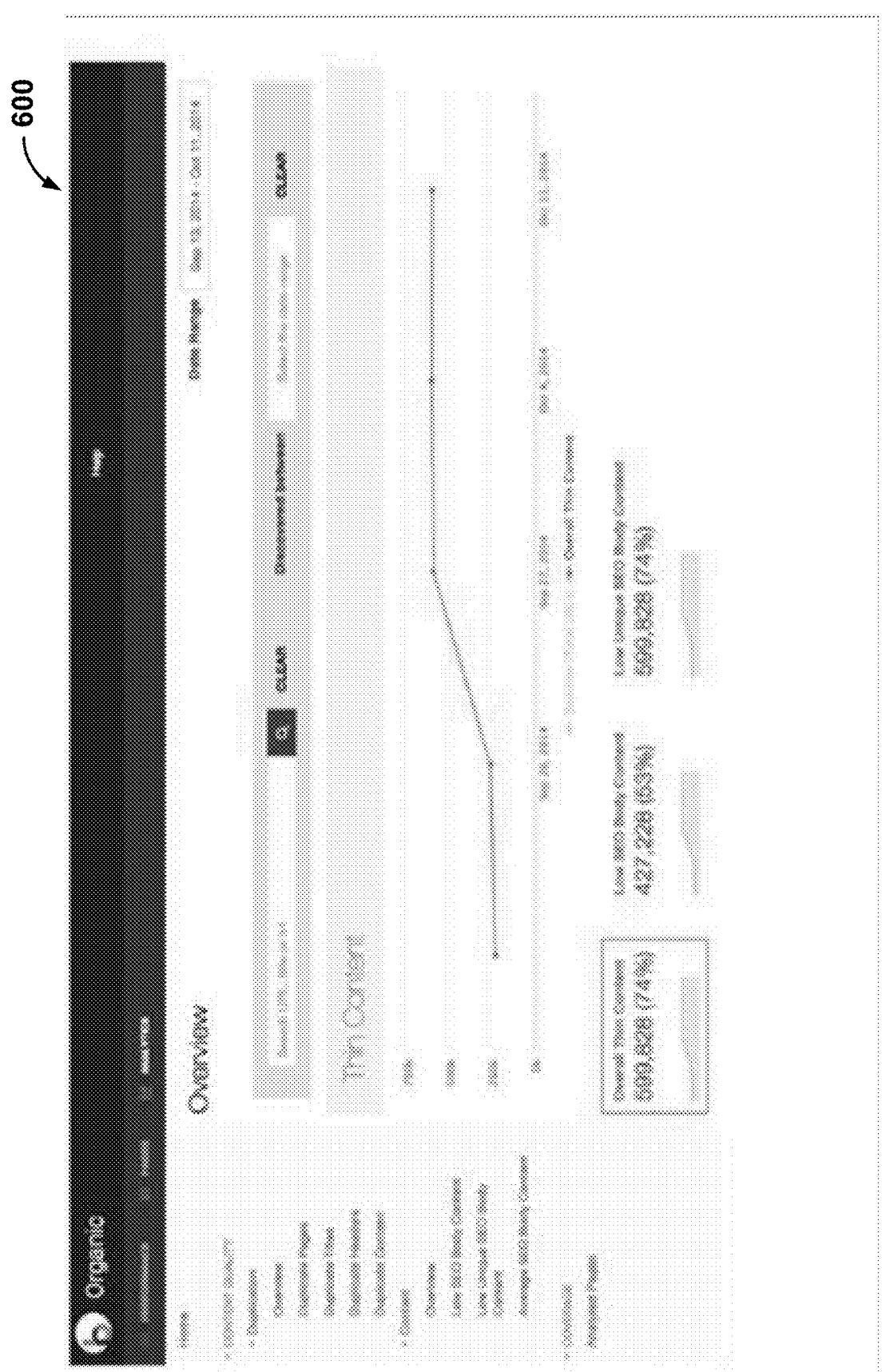
FIG. 6 illustrates an embodiment of a thin content reporting screen of the content performance analytics system that summarizes various thin content related site issues identified using the disclosed techniques.

FIG. 6 illustrates an embodiment of a thin content reporting screen of the content performance analytics system that summarizes various thin content related site issues identified using the disclosed techniques. As shown, a thin content reporting screen 600 illustrates various graphs and trends for thin content (e.g., overall thin content, low SEO body content, and low unique SEO body content).

Figure 7:
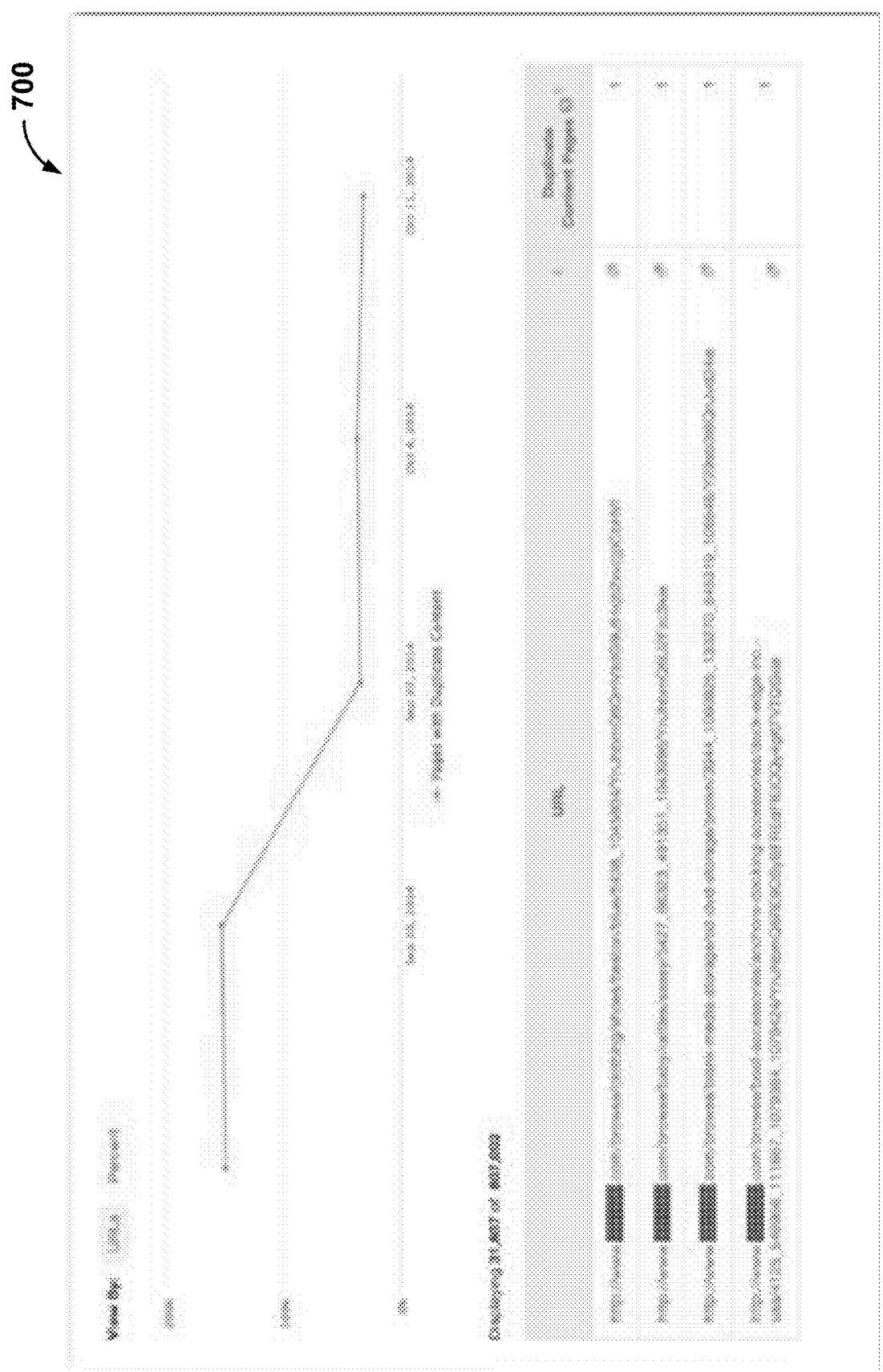
FIG. 7 illustrates an embodiment of a duplication trend reporting screen of the content performance analytics system that summarizes a trend over time for duplication of content related site issues identified using the disclosed techniques.

FIG. 7 illustrates an embodiment of a duplication trend reporting screen of the content performance analytics system that summarizes a trend over time for duplication of content related site issues identified using the disclosed techniques. As shown, a duplication trend reporting screen 700 illustrates a graph showing a recent trend for pages with duplicate content for an analyzed web site and a (partial) list of URLs that were identified with duplicate content pages and a number of duplicate content pages.

Figure 8:
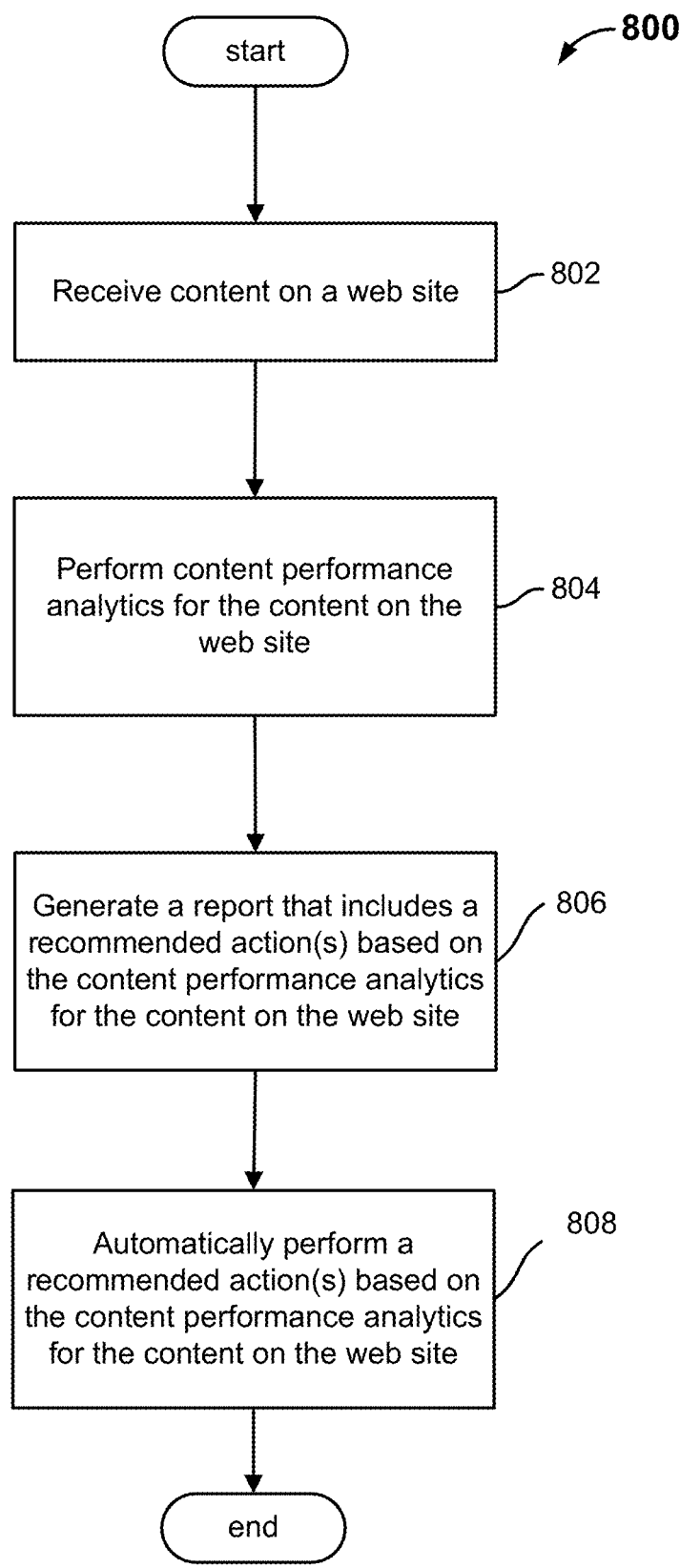
FIG. 8 is a flow diagram illustrating a process for performing content performance analytics in accordance with some embodiments.

FIG. 8 is a flow diagram illustrating a process for performing content performance analytics in accordance with some embodiments. In one embodiment, process 800 is performed by a content performance analytics system, such as described above with respect to FIGS. 1-7.

The process begins at 802. At 802, content on a web site is received. For example, pages of a web site (e.g., a merchant's web site) can be crawled and fetched for processing by the content performance analytics (CPA) system, such as similarly described above. In some cases, various other data sources associated with the web site can be collected and/or received for processing by the CPA system, including a merchant data feed, behavioral data, a site map, and/or a web server/API logs, such as similarly described above.

At 804, a content performance analytics of content available on the web site is performed. For example, the CPA system can perform various disclosed content performance analytics (CPA) techniques on the content of the web site.

At 806, a report (e.g., a CPA report) that includes a recommended action(s) is generated based on the content performance analytics for the content on the web site. For example, the CPA report can summarize and/or provide specific information related on various content related site health issues for the web site, including content quality issues, duplication issues, thin content issues, flux issues, volume issues, HTML errors, link structure, and/or various other content related site health issues, such as similarly described above.

At 808, a recommended action(s) is automatically performed based on the content performance analytics for the content on the web site. For example, a recommended remediation action(s) in the CPA report, which was approved for implementing on the web site by an authorized user (e.g., admin) for the web site, can be automatically performed using a widget, such as a related products widget and/or a related searches widget, to add content, add links, and/or to perform other actions to improve the content related site health issue(s) of the web site, such as similarly described above. As another example, the CPA system can be configured to prioritize a remediation action for a content related site health issue for a web page associated with the content on the web site based on behavior data associated with the web page (e.g., a page that is associated with higher traffic and/or higher revenue can be prioritized), such as similarly described above.

Figure 9:
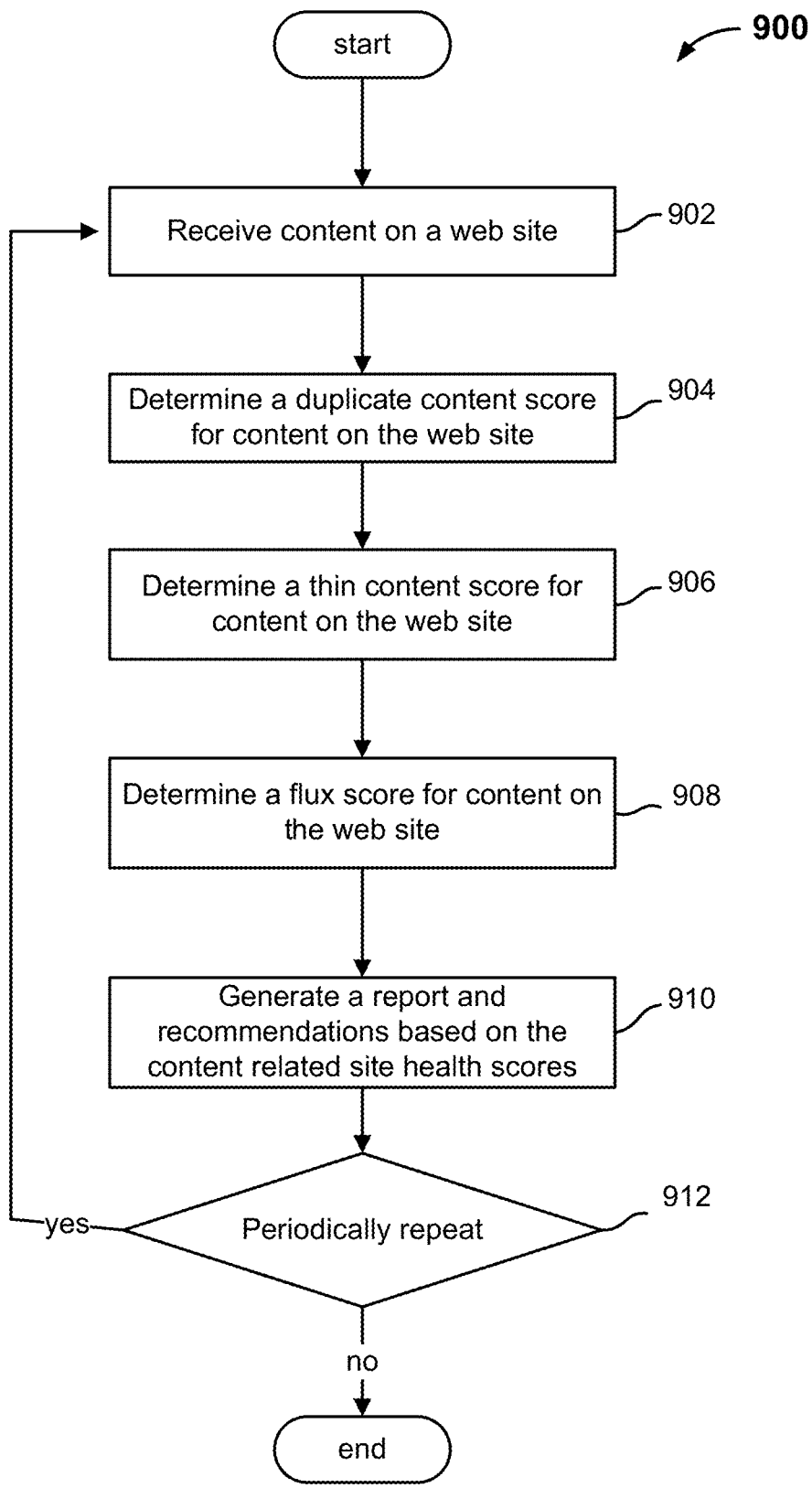
FIG. 9 is another flow diagram illustrating a process for performing content performance analytics in accordance with some embodiments.

FIG. 9 is another flow diagram illustrating a process for performing content performance analytics in accordance with some embodiments. In one embodiment, process 900 is performed by a content performance analytics system, such as described above with respect to FIGS. 1-7.

The process begins at 902. At 902, content on a web site is received. For example, pages of a web site (e.g., a merchant's web site) can be crawled and fetched for processing by the content performance analytics (CPA) system, such as similarly described above. In some cases, various other data sources associated with the web site can be collected and/or received for processing by the CPA system, including a merchant data feed, behavioral data, a site map, and/or a web server/API logs, such as similarly described above.

At 904, a duplicate content score is determined for content on the web site. For example, the CPA system (e.g., implemented using a duplicate content detector) can identify duplicate pages on the web site based on a threshold comparison of the content (e.g., the unique content) on the web pages of the web site, such as similarly described above.

At 906, a thin content score is determined for content on the web site. For example, the CPA system (e.g., implemented using a thin content detector) can identify web pages on the web site that have less than a threshold amount of unique content, such as similarly described above.

At 908, a flux score is determined for content on the web site. For example, the CPA system (e.g., implemented using a flux scoring engine) can identify web pages on the web site that have a threshold level of flux associated with content (e.g., unique content) on the web page, such as similarly described above.

At 910, a report (e.g., a CPA report) that includes a recommended action(s) is generated based on the content performance analytics for the content on the web site. In one embodiment, the CPA system performs content performance analytics for content on the web site to identify various content related site health issues for the web site, including content quality issues, duplication issues, thin content issues, flux issues, volume issues, HTML errors, link structure, and/or various other content related site health issues, such as similarly described above. For example, the CPA report can summarize and/or provide specific information related on various content related site health issues for the web site, including content quality issues, duplication issues, thin content issues, flux issues, volume issues, HTML errors, link structure, and/or various other content related site health issues, such as similarly described above. In some cases, the CPA system (e.g., implemented using a CPA engine) can generate a trending report for one or more site health issues for content on the web site (e.g., the trending report can include a graphic visualization of a performance of the content on the web site over a period of time), such as similarly described above.

At 912, whether the process is to be periodically repeated for the web site is determined. If so, processing returns to 902. If not, then the process is completed (e.g., until new or updated merchant data is received at the CPA system for processing or upon user demand to update the CPA report for the web site). For example, a user can request a trend report that includes a graphic visualization for the performance of the content on the web site for one or more content related site health issues over a period of time (e.g., a last 30 days or some other period of time), including content quality issues, duplication issues, thin content issues, flux issues, volume issues, HTML errors, link structure, and/or various other content related site health issues, such as similarly described above.

Figure 10:
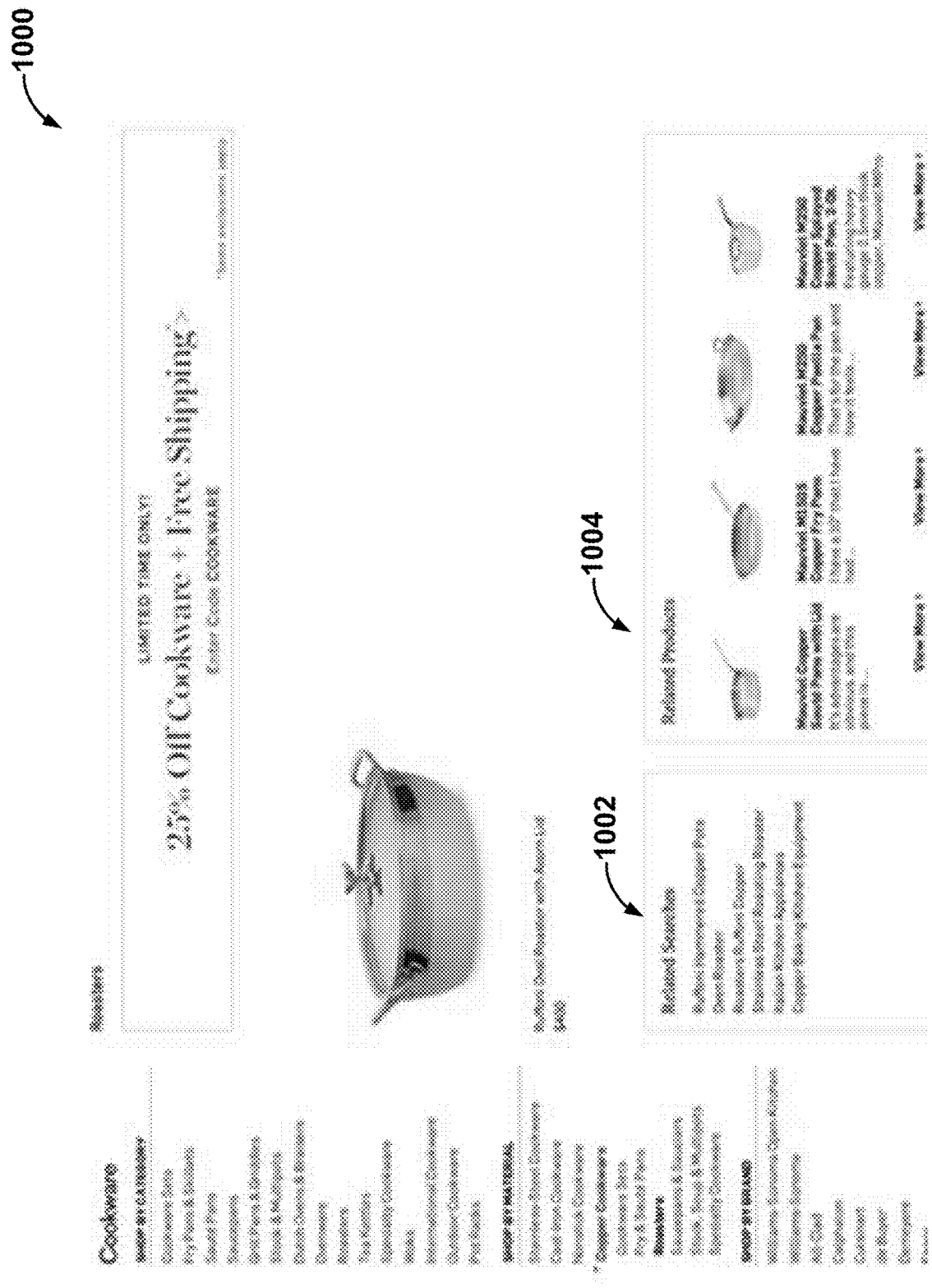
FIG. 10 illustrates a merchant web site screen that includes widgets for automatically implementing recommended remedial actions using the content performance analytics system in accordance with some embodiments.

FIG. 10 illustrates a merchant web site screen that includes widgets for automatically implementing recommended remedial actions using the content performance analytics system in accordance with some embodiments. In particular, an example implementation of automatically performed remedial actions using one or more widgets is shown with respect to a merchant web page 1000 as shown in FIG. 10 as described below.

In one embodiment, the content performance analytics system (e.g., content performance analytics system 102) is configured to perform automatic remediation for one or more aspects identified based on site health status. For example, the content performance analytics system can automatically add content (e.g., by leveraging the existing content on a merchant's web site) to one or more web pages of a web site to remediate for, for example, thin content on the web site and/or other content related site health issues as described herein, such as using a related searches widget as shown at 1002 and/or a related products widget as shown at 1004 to supplement one or more content related site health issues identified in a CPA report for one or more web pages of the web site. In an example implementation, such widgets can be dynamically populated via a remote API call or other data delivery mechanism.

In an example use case scenario, a merchant web site page, such as page 1000, can be identified as having an insufficient number of products, such as only showing a single product. In some cases, the CPA system (e.g., content performance analytics system 102) can be configured to perform automatic remediation for such a site health status issue (e.g., thin content issue, in which a desired number of products is typically three to five products on a page; or duplication issue, in which the desired outcome is to have a web page with unique content versus other pages on the web site) by providing a related searches widget to suggest additional searches for relevant products as shown at 1002 and/or also using a related products widget to show four additional relevant products on this page as shown at 1004 (e.g., which can address a thin content issue by showing additional products on the page; or can address a duplication issue by showing different products on the page to make the page distinct from the identified duplicate page). In some cases, the web site administrator can configure automated remedial action settings that determine whether the CPA system is authorized to automatically perform such recommended remedial actions and/or to require approval from the web site administrator (e.g., to allow the web site administrator to override and/or customize any such recommended remedial actions).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing content performance analytics, comprising:
a processor; and
a memory coupled with the processor, wherein the memory is configured to provide the processor with instructions which when executed cause the processor to:
store web services data associated with a web site, wherein the web services data comprises content on the web site;
receive content available on the web site based on the web services data;
perform content performance analytics on the content available on the web site, comprising to:
perform at least two of the following:
identify web pages associated with the content on the web site that have less than a threshold level of unique content, comprising to:
determine a number of web pages on the web site that exceed a first threshold in an amount of duplication as a web page_being evaluated, comprising to:
determine whether body content of a first web page has duplicative body content of the web page being evaluated exceeding the first threshold, the body content of the first web page excluding a HyperText Markup Language (HTML) template;
determine a number of web pages on the web site that have titles that exceed a second threshold in an amount of duplication as a title of the web page_being evaluated, comprising to:
determine whether a title of a second web page is an exact duplicate of a title of the web page being evaluated;
determine a number of web pages on the web site that have headers that exceed a third threshold in an amount of duplication as a header of the web page_being evaluated, comprising to:
determine whether a header of a third web page is an exact duplicate of a header of the web page_being evaluated; or
any combination thereof;
determine a content score for content on the web site, comprising to:
determine a percent of keywords within a title and a header that are used within a body content of a fourth web page of the web site;
determine how relevant a set of products on a fifth web page of the web site are in relation to a set of keywords found within a title and a header of the fifth web page; or
a combination thereof; or
determine an overall volume score for content on the web site, comprising to:
determine a number of products that exist on a sixth web page of the web site, the sixth web page having a plurality of products;
determine a number of unique words on a seventh web page of the web site;
determine a total number of words on an eighth web page of the web site;
determine a number of unique words within a title tag and a header tag of a ninth web page of the web site; or
any combination thereof;
generate a report that includes a remediation action based on the content performance analytics for the content on the web site; and
automatically perform a remediation action based on the content performance analytics for the content on the web site to make changes to at least a portion of content of at least one web page_being displayed on the web site.

2. The system recited in claim 1, wherein the web site corresponds to a merchant web site, and wherein the web services data comprises content for the merchant web site.

3. The system recited in claim 1, wherein the web site corresponds to a merchant web site, wherein the web services data comprises content for the merchant web site, and wherein the content comprises a plurality of products available for sale on the merchant web site.

4. The system recited in claim 1, wherein the web site corresponds to a merchant web site, wherein the web services data comprises content for the merchant web site, and wherein the web services data further comprises a merchant data feed.

5. The system recited in claim 1, wherein the web site corresponds to a merchant web site, wherein the web services data comprises content for the merchant web site, and wherein the web services data further comprises a merchant data feed.

6. The system recited in claim 1, wherein the web site corresponds to a merchant web site, wherein the web services data comprises content for the merchant web site, and wherein the web services data further comprises a merchant data feed and behavioral data associated with user activity on the merchant web site.

7. The system recited in claim 1, wherein the web site corresponds to a merchant web site, wherein the web services data comprises content for the merchant web site, and wherein the web services data further comprises a merchant data feed, web page content associated with the merchant web site, and behavioral data associated with user activity on the merchant web site.

8. The system recited in claim 1, wherein the web site corresponds to a merchant web site, wherein the web services data comprises content for the merchant web site, and wherein the web services data further comprises a merchant data feed, web page content associated with the merchant web site, behavioral data associated with user activity on the merchant web site, a site map for the merchant web site, and a web server/API log for the merchant web site.

9. The system recited in claim 1, wherein the web services data further comprises content for a plurality of web sites.

10. The system recited in claim 1, wherein the processor is configured to prioritize a remediation action for a content related site health issue for a web page associated with the content on the web site based on behavior data associated with the web page.

11. The system recited in claim 1, wherein the processor is further configured to:
generate a trending report for one or more site health issues for content on the web site.

12. The system recited in claim 1, wherein the processor is further configured to:

generate a trending report for one or more site health issues for content on the web site, wherein the trending report includes a graphic visualization of a performance of the content on the web site over a period of time.

13. A method of performing content performance analytics, comprising:
receiving content on a web site;
performing content performance analytics of content available on the web site using a processor, comprising:
performing at least two of the following:
identifying web pages associated with the content on the web site that have less than a threshold level of unique content, comprising:
determining a number of web pages on the web site that exceed a first threshold in an amount of duplication as a web page being evaluated, comprising:
determining whether body content of a first web page has duplicative body content of the web page_being evaluated exceeding the first threshold, the body content of the first web page excluding a HyperText Markup Language (HTML) template;
determining a number of web pages on the web site that have titles that exceed a second threshold in an amount of duplication as a title of the web page_being evaluated, comprising:
determining whether a title of a second web page is an exact duplicate of a title of the web page_being evaluated;
determining a number of web pages on the web site that have headers that exceed a third threshold in an amount of duplication as a header of the web page_being evaluated, comprising:
determining whether a header of a third web page is an exact duplicate of a header of the web page_being evaluated; or
any combination thereof;
determining a content score for content on the web site, comprising:
determining a percent of keywords within a title and a header that are used within a body content of a fourth web page of the web site;
determining how relevant a set of products on a fifth web page of the web site are in relation to a set of keywords found within a title and a header of the fifth web page; or
a combination thereof; or
determining an overall volume score for content on the web site, comprising:
determining a number of products that exist on a sixth web page of the web site, the sixth web page having a plurality of products;
determining a number of unique words on a seventh web page of the web site;
determining a total number of words on an eighth web page of the web site;
determining a number of unique words within a title tag and a header tag of a ninth web page of the web site; or
any combination thereof; or
a combination thereof;
generating a report that includes a recommended action based on the content performance analytics for the content on the web site; and
automatically performing a recommended action based on the content performance analytics for the content on the web site to make changes to at least a portion of content of at least one web page_being displayed on the web site.

14. A computer program product for performing content performance analytics, the computer program product being embodied in a non-transitory computer readable storage medium and comprising computer instructions for:
receiving content on a web site;
performing content performance analytics of content available on the web site, comprising:
performing at least two of the following:
identifying web pages associated with the content on the web site that have less than a threshold level of unique content, comprising:
determining a number of web pages on the web site that exceed a first threshold in an amount of duplication as a web page being evaluated, comprising:
determining whether body content of a first web page has duplicative body content of the web page_being evaluated exceeding the first threshold, the body content of the first web page excluding a HyperText Markup Language (HTML) template;
determining a number of web pages on the web site that have titles that exceed a second threshold in an amount of duplication as a title of the web page_being evaluated, comprising:
determining whether a title of a second web page is an exact duplicate of a title of the web page_being evaluated; or
determining a number of web pages on the web site that have headers that exceed a third threshold in an amount of duplication as a header of the web page_being evaluated, comprising:
determining whether a header of a third web page is an exact duplicate of a header of the web page_being evaluated; or
any combination thereof;
determining a content score for content on the web site, comprising:
determining a percent of keywords within a title and a header that are used within a body content of a fourth web page of the web site;
determining how relevant a set of products on a fifth web page of the web site are in relation to a set of keywords found within a title and a header of the fifth web page; or
a combination thereof; or
determining an overall volume score for content on the web site, comprising:
determining a number of products that exist on a sixth web page of the web site, the sixth web page having a plurality of products;
determining a number of unique words on a seventh web page of the web site;
determining a total number of words on an eighth web page of the web site;
determining a number of unique words within a title tag and a header tag of a ninth web page of the web site; or any combination thereof;

generating a report that includes a recommended action based on the content performance analytics for the content on the web site; and automatically performing a recommended action based on the content performance analytics for the content on the web site to make changes to at least a portion of content of at least one web page_being displayed on the web site.

* * * * *